(12) United States Patent
Carpenter et al.

(10) Patent No.: US 7,739,814 B2
(45) Date of Patent: Jun. 22, 2010

(54) POINT AND ADAPTER ASSEMBLY

(75) Inventors: Christopher M. Carpenter, Tualatin, OR (US); Robert S. Fleck, Aurora, OR (US); Terry L. Briscoe, Portland, OR (US); Daniel R. Danks, Portland, OR (US); Venkat R. Gaurav, Aloha, OR (US); Larren F. Jones, Portland, OR (US)

(73) Assignee: ESCO Corporation, Portland, OR (US)

( * ) Notice: Subject to any disclaimer, the term of this patent is extended or adjusted under 35 U.S.C. 154(b) by 642 days.

(21) Appl. No.: 11/498,407

(22) Filed: Aug. 2, 2006

(65) Prior Publication Data

US 2006/0265916 A1   Nov. 30, 2006

Related U.S. Application Data

(63) Continuation of application No. 10/714,884, filed on Nov. 18, 2003, now Pat. No. 7,100,315, which is a continuation of application No. 09/899,535, filed on Jul. 6, 2001, now Pat. No. 6,735,890.

(51) Int. Cl.
    *E02F 9/28* (2006.01)
(52) U.S. Cl. .............................. 37/450; 37/453; 37/456
(58) Field of Classification Search .................. 37/466, 37/450, 452–460
    See application file for complete search history.

(56) References Cited

U.S. PATENT DOCUMENTS

| 821,215 | A | 5/1906 | Cantlebery et al. |
| 1,729,889 | A | 10/1929 | McNinch |
| 2,032,875 | A | 3/1936 | Graham |
| 2,040,085 | A | 5/1936 | Fykse et al. |
| 2,124,230 | A | 7/1938 | Hosmer et al. |
| 2,145,663 | A | 1/1939 | Reynolds |
| 2,419,677 | A | 4/1947 | Daniels et al. |
| 2,483,032 | A | 9/1949 | Baer |
| 2,846,790 | A | 8/1958 | Davis et al. |
| 2,896,345 | A | 7/1959 | Peklay |
| 2,982,035 | A | 5/1961 | Stephenson |
| 2,987,838 | A | 6/1961 | Stratton |
| 3,082,555 | A | 3/1963 | Hill |
| 3,117,386 | A | 1/1964 | Ferwerda |
| 3,453,756 | A | 7/1969 | Schroeder |
| 3,496,658 | A | 2/1970 | Eyolfson |
| 4,103,442 | A | 8/1978 | Zepf |
| 4,136,469 | A | 1/1979 | Zepf |
| 4,326,348 | A | 4/1982 | Emrich |
| 4,335,532 | A | 6/1982 | Hahn et al. |
| 4,391,050 | A | 7/1983 | Smith et al. |
| 4,404,760 | A | 9/1983 | Hahn et al. |

(Continued)

FOREIGN PATENT DOCUMENTS

DE   2162474   12/1971

(Continued)

*Primary Examiner*—Alicia M Torres
(74) *Attorney, Agent, or Firm*—Steven P. Schad

(57) ABSTRACT

A wear assembly includes an adapter with a nose, a wear member with a socket to receive the nose, and a lock to secure the wear member to the adapter.

The nose and socket include complementary rails and grooves that vertically diverge as they extend from the front of the nose. The lock can have a tapered construction.

19 Claims, 19 Drawing Sheets

U.S. PATENT DOCUMENTS

| | | | |
|---|---|---|---|
| 4,470,210 A | 9/1984 | Hahn | |
| 4,481,728 A | 11/1984 | Mulder et al. | |
| 4,577,423 A | 3/1986 | Hahn | |
| 4,761,900 A | 8/1988 | Emrich | |
| 4,811,505 A | 3/1989 | Emrich | |
| 4,965,945 A | 10/1990 | Emrich | |
| 5,018,283 A | 5/1991 | Fellner | |
| 5,068,986 A | 12/1991 | Jones | |
| 5,074,062 A | 12/1991 | Hahn et al. | |
| 5,148,616 A | 9/1992 | Maguina-Larco | |
| 5,152,087 A | 10/1992 | Maguina-Larco | |
| 5,152,088 A | 10/1992 | Hahn | |
| 5,177,886 A | 1/1993 | Klett | |
| 5,272,824 A | 12/1993 | Cornelius | |
| 5,325,615 A | 7/1994 | Hutchins et al. | |
| 5,423,138 A | 6/1995 | Livesay et al. | |
| 5,469,648 A | 11/1995 | Jones et al. | |
| 5,561,925 A | 10/1996 | Livesay | |
| 5,564,206 A | 10/1996 | Ruvang | |
| 5,709,043 A | 1/1998 | Jones et al. | |
| 5,718,070 A | 2/1998 | Ruvang | |
| 5,778,571 A | 7/1998 | Pasqualini et al. | |
| 5,802,752 A | 9/1998 | Quarfordt | |
| 5,868,518 A | 2/1999 | Chesterfield et al. | |
| 5,918,391 A | 7/1999 | Vinas Peya | |
| 5,937,550 A | 8/1999 | Emrich | |
| 5,956,874 A | 9/1999 | Ianello et al. | |
| 5,992,063 A | 11/1999 | Mack | |
| 6,018,896 A | 2/2000 | Adamic | |
| 6,030,143 A | 2/2000 | Kreitzberg | |
| 6,047,487 A | 4/2000 | Clendenning | |
| 6,108,950 A | 8/2000 | Ruvang et al. | |
| 6,158,917 A | 12/2000 | Wolin et al. | |
| 6,247,255 B1 | 6/2001 | Clendenning | |
| 6,374,521 B1 | 4/2002 | Pippins | |

FOREIGN PATENT DOCUMENTS

| | | |
|---|---|---|
| EP | 1048792 A1 | 11/2000 |
| FR | 2 545 122 | 11/1984 |
| SE | 469561 | 7/1993 |

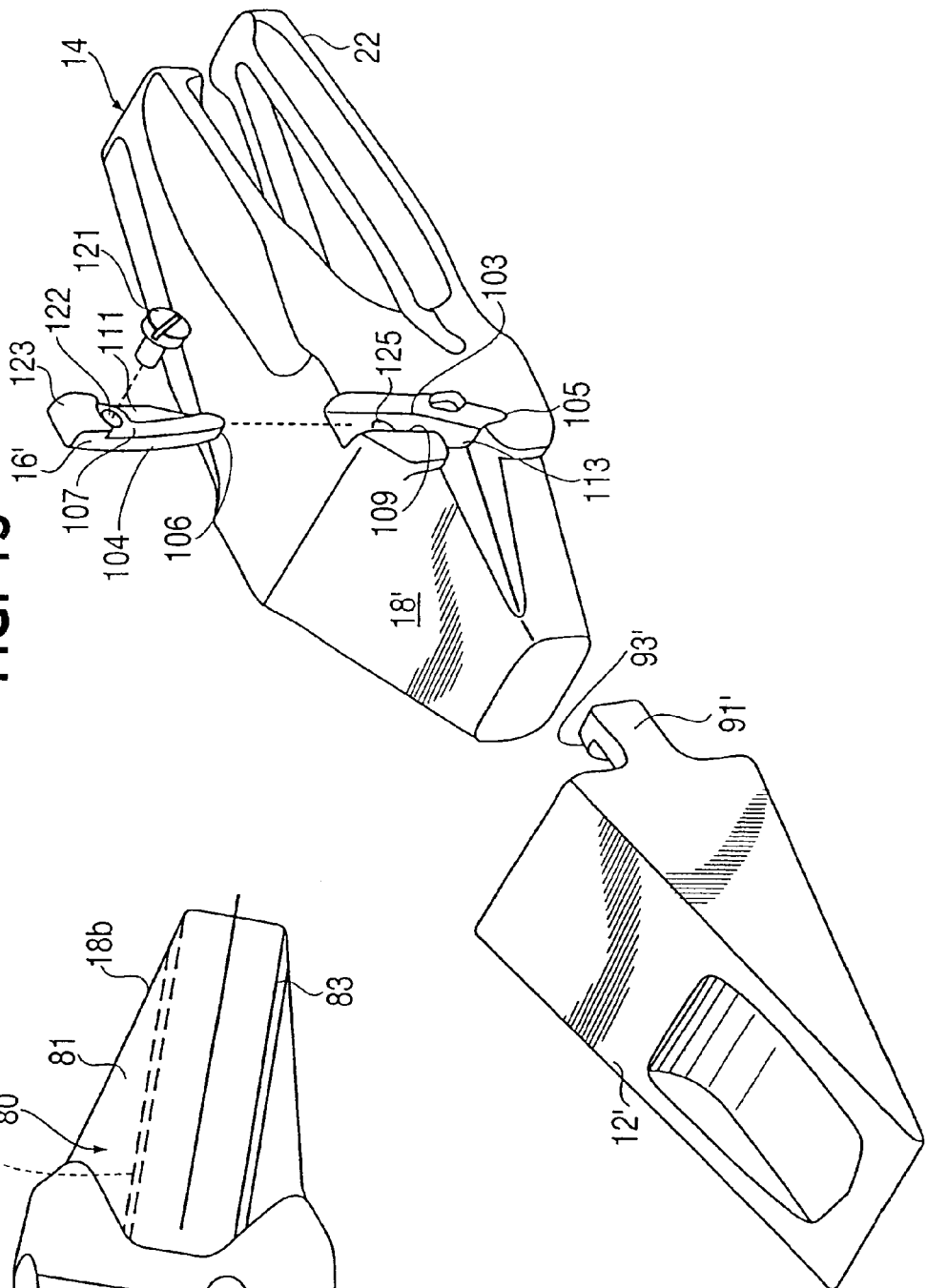
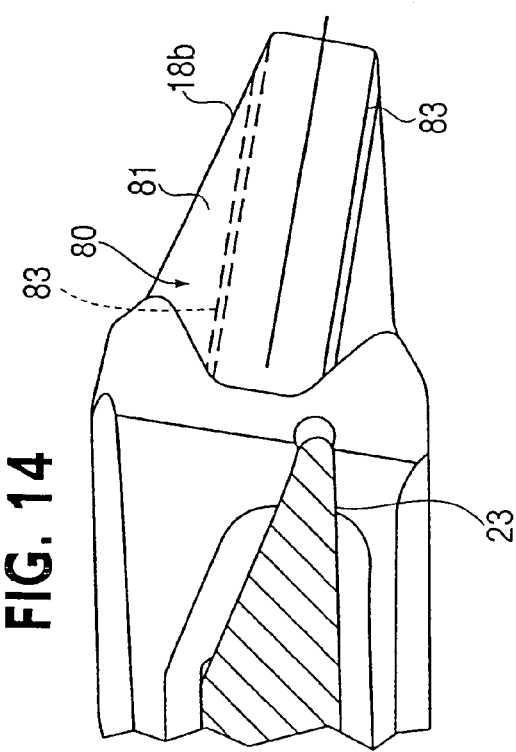
FIG. 14
FIG. 15

POINT AND ADAPTER ASSEMBLY

FIELD OF THE INVENTION

The present invention pertains to a wear assembly, and especially to a wear assembly for use with mining, excavating and earthmoving equipment. The inventive design is particularly well suited for an excavating tooth, but may also be used for the support of other wear members.

BACKGROUND OF THE INVENTION

In mining and construction, wear members are typically provided along the digging edge of the equipment to protect the bucket or the like and/or to engage and break up the ground to be gathered. Accordingly, the wear parts are subjected to highly abrasive conditions and experience considerable wearing. The wear parts must then be replaced on a periodic basis.

In order to minimize the loss of material due to replacement of worn parts, the wear assemblies are typically manufactured as two or more separable components including an adapter and a wear member. The adapter is attached to the digging edge by welding, mechanical attachment, or being cast along an edge of the excavating device so as to present a forwardly projecting nose for supporting the wear member. The wear member has a socket that is received over the nose, and a forward working end. In a point, the working end is typically a narrowed digging edge. The wear member substantially envelops the adapter nose and thereby tends to protect the nose from wear. For example, depending on a variety of factors, generally five to twenty points can be successively mounted on a single adapter before the adapter becomes worn and in need of replacement. To accommodate replacement of the wear member in the field, the wear member is usually secured to the adapter nose by a removable lock (e.g., a lock pin).

Wear assemblies used in mining, excavation and construction, and particularly excavating tooth systems, are subjected to large and varied forces applied in all directions. As a result, points and other wear members must be firmly secured to the adapter to withstand the axial, vertical, reverse and lateral loads as well as impacts, vibrations and other kinds of forces. Vertical loads have been particularly troublesome in that large moment forces are generated that tend to "rotate" the wear members forward on the adapter and at times result in the ejection of the member. While the walls of the adapter nose provide support for the wear member, the lock in most cases also plays a large role in retaining the point and resisting loads, particularly moment and reverse forces.

In a conventional tooth system 1 (FIG. 22), the adapter nose 2 and complementary socket 3 in the point 4 are wedge-shaped and include converging top and bottom surfaces 2*a*, 2*b*, 3*a*, 3*b*. A central downward load P applied at the free end 4*a* of the point 4 will apply a moment force that tends to rotate the point 4 on the nose 2. The load P is generally transmitted to and resisted by the upper side of the nose tip 2*c* contacting the front end 3*c* of the socket 3 (reaction force A) and by the lower side of a base portion 2*d* of the nose contacting the base or rear end 4*d* of the point 4 (reaction force B). These reaction forces form a counteractive moment to resist the moment formed by force P. As can be appreciated, large vertical forces can create substantial ejection forces. Moreover, the impacts, vibration, wear, and presence of fines, etc. exacerbate the difficulty of resisting high ejection forces.

In the present example of a central downward load P, the vertical component of reaction force A, in general, equals the downward load P plus the vertical component of reaction force B. However, because of the converging walls of the nose, the horizontal component of each of the reaction forces A and B is in a forward direction that tends to urge the point off the nose. To the extent these forces are not resisted directly by the geometry and friction of the nose and socket, they are resisted as shear loads by the lock pin. The repeated application of high shear loads can place unacceptably high stresses on the lock pin and result in its breakage.

Further, in such conventional teeth, the lock pin is typically hammered into place and tightly held by frictional forces applied primarily by the placement of the holes in the point relative to the hole in the adapter nose. However, wearing of the point and adapter will tend to loosen the connection and increase the risk of losing the lock pin. Accordingly, the lock pin is often initially set very tightly in the defined opening so as to put off the time when excessive looseness develops. The lock pin must then be driven into and out of the opening by repeated blows of a large hammer. This can be a troublesome and time-consuming task, especially in the larger sized teeth.

A take-up elastomer has often been placed in front of the lock pin in an effort to maintain a tight fit between the point and adapter when wearing begins to develop. While the elastomer functions to pull the point onto the adapter, it also reduces the lock's ability to resist the applied moment and reverse forces. These loads tend to place more stress on the elastomer than it can withstand. As a result, during use, overworking of the elastomer can result in its premature failure and loss of the lock pin, which then results in loss of the point.

The loss of a point due to pin failure, looseness or elastomer problems not only results in premature loss of the point and wearing of the adapter nose, but also in possible damage to machinery that may be processing the excavated material, particularly in a mining operation. Moreover, since the adapter is often welded in place, replacement of an adapter usually results in significant down time for the digging equipment.

A variety of different point and nose designs have been developed to increase the stability of the point-adapter coupling, reduce the forces tending to eject the point, and lessen loading on the lock.

In one tooth design 1' (FIG. 23) the front end of the nose 2' and socket 3' are each provided with a squared configuration having upper and lower stabilizing flats 5', 6'. On account of the stabilizing flat 5', a central downward load P' on the free end 4*c'* of the point 4' will be transmitted to the nose tip 2*a'* so as to generate a vertical reaction force A' which generally has no substantial horizontal component tending to eject the point from the nose. Nevertheless, the reaction force B' will still generate a substantial forward horizontal component at the rear of the point that tends to push the point from the nose. While this design improves the stability of the point over the conventional tooth system, it still applies a substantial ejection force and can place high shear forces on the lock.

In another design, such as disclosed in U.S. Pat. No. 5,709,043 to Jones et al., the nose and socket are each provided with a front squared section and rear bearing surfaces that are substantially parallel to the longitudinal axis of the tooth. In this construction, the combined effect of the front stabilizing flats and parallel bearing surfaces create reaction forces at the tip and base of the nose that are generally only vertical. Such vertical reaction forces will in general not generate substantial horizontal components. Accordingly, this construction greatly reduces the forces tending to push the point off of the adapter. Such stabilizing of the point also reduces shifting and movement of the point on the adapter nose for reduced wearing. Nevertheless, multiple other factors (such as impacts, etc.) as well as reverse forces can still apply high shear forces to the lock.

In one other design, such as disclosed in U.S. Pat. No. 4,353,532 to Hahn, the point and adapter are each provided with a helical turn or thread so that the point is rotated about its longitudinal axis when mounted on the adapter nose. On account of the threads, the point rotates about the longitudinal axis of the tooth and generally presses the lock against the adapter nose when ejection forces are applied. The lock is much less likely to fail when under these kinds of compression forces as opposed to the high shear forces applied in conventional teeth. While this construction provides great strength and retention benefits, the nose and socket are complex and more expensive to manufacture.

SUMMARY OF THE INVENTION

The present invention pertains to a wear assembly that provides a stable coupling which is able to resist heavy loading without placing undue stress on the lock.

In one aspect of the invention, a wear assembly includes bearing surfaces that are formed such that the wear member is tightened onto the adapter with the application of certain loads on the wear member. In one preferred construction, the bearing surfaces are oriented such that the horizontal components of reaction forces generated to resist, for example, centrally applied vertical loads are directed rearward so as to push the wear member more tightly onto the adapter nose.

In another aspect of the invention, the wear member rotates on and off of the adapter about its longitudinal axis to better resist ejection forces. In a preferred embodiment, the rotation is accomplished with generally linear rails and grooves that are easy and inexpensive to manufacture. These complementary rails and grooves enable the assembly to have a more slender profile than otherwise possible with helical threads for better penetration in excavation uses and less use of metal. Such grooves and rails also avoid the generation of high stress risers due to the use of relatively sharp grooves used to form helical threads.

In another aspect of the invention, the adapter nose or socket of the wear member is formed with rails that diverge as they extend rearward. The complementary nose or socket then includes grooves that matingly receive the rails. In a preferred embodiment, the vertical divergence of the rails precludes an axial mounting of the wear member and requires the wear member to twist as it is moved onto or off of the adapter nose.

In another aspect of the invention, the adapter includes two bearing surfaces positioned on opposite sides of the longitudinal axis and facing in opposite directions. In a preferred embodiment, these bearing surfaces reduce wear on the extreme fibers on the top and bottom of the nose. Moreover, the bearing surfaces are preferably formed as part of rails on the adapter so as to form a generally Z-shaped cross-section.

In another aspect of the invention, the adapter nose and socket of the wear member widen as they extend forwardly. In a preferred embodiment, the adapter and socket include complementary rails and grooves that diverge to require twisting of the wear member during installation. This construction provides sufficient clearance to receive the forwardly widened nose into the socket to better resist ejection of the wear member.

In another aspect of the invention, the lock is tapered to fit into a complementary channel to reduce frictional forces and ease the insertion and removal of the lock. In this configuration, the length of the lock does not frictionally slide through aligned openings, but rather engages the sides of the channel at or near the place of engagement. Hammering of the lock as it is inserted or removed is avoided. In a preferred embodiment, the lock includes a lock member to secure the lock in the channel to prevent unwanted loss or ejection.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 14 is a side elevational view of an adapter of another alternative embodiment of a tooth system in accordance with the present invention.

FIG. 15 is an exploded perspective view of a second tooth system in accordance with the present invention with an alternative lock.

DETAILED DESCRIPTION OF THE PREFERRED EMBODIMENTS

The present invention is directed to a wear assembly for protecting a wear surface. In particular, the wear assembly is especially adapted for use in excavating, mining, construction and the like. The wear assembly is well suited for use in forming an excavating tooth system, but could also be used to form other wear members.

Figure 1:
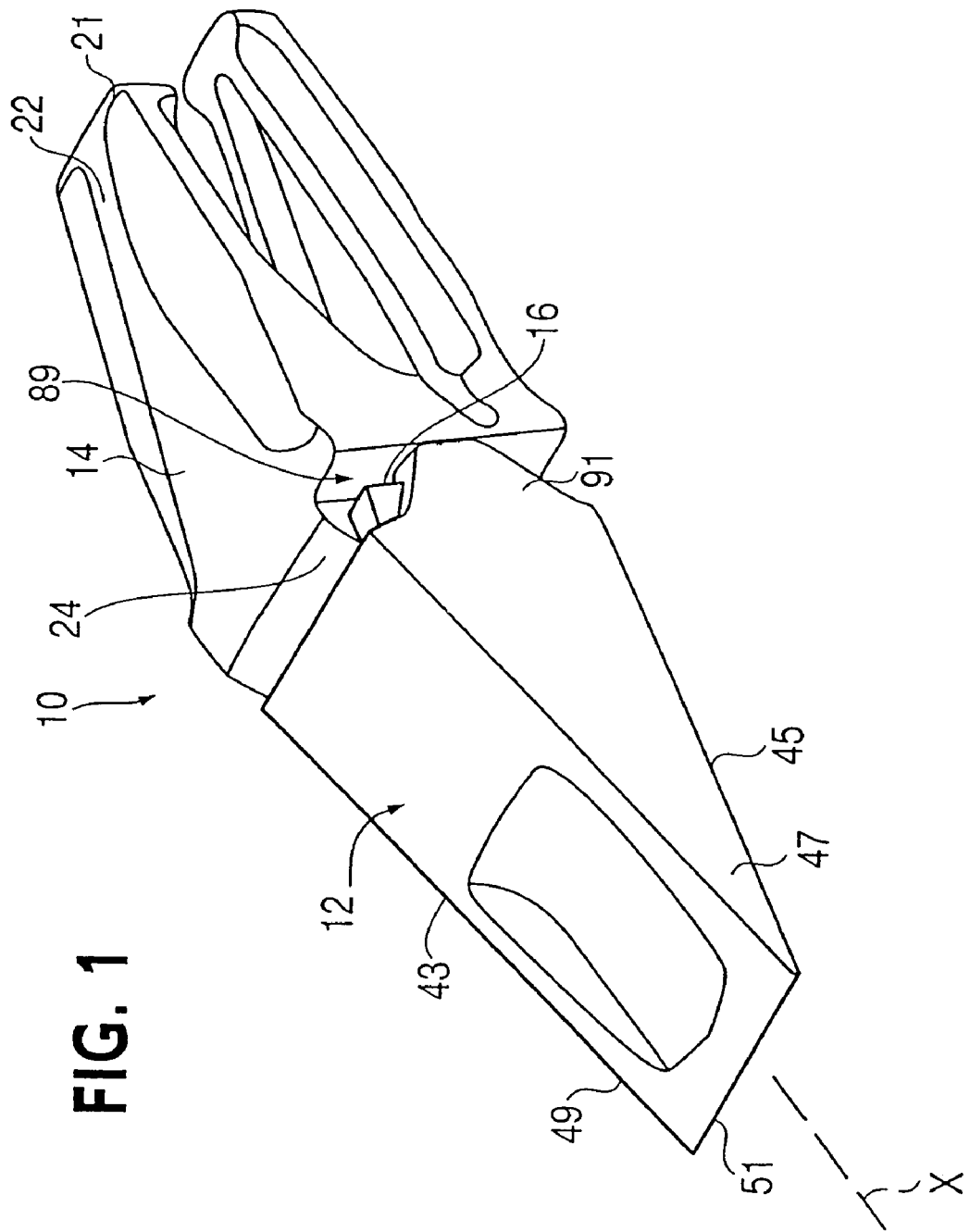
FIG. 1 is a perspective view of an excavating tooth system in accordance with the present invention.

For purposes of illustration, the present application describes the inventive construction as an excavating tooth system. The production of other wear parts (e.g., a shroud) would utilize the same nose and socket constructions, but could have different working and mounting ends. For the sake of description only, terms such as upper, lower, vertical, etc. are used in this specification and are to be understood as pertaining to the tooth system as oriented in FIG. 1. The use of these terms is not an indication that these particular orientations are required for the wear assembly. The wear assembly could be oriented differently than as illustrated in FIG. 1.

In a preferred construction, a tooth system 10 comprises a point 12, adapter 14 and lock 16 (FIGS. 1-10). The adapter 14 preferably includes a forwardly projecting nose 18 and a mounting end 21 in the form of a pair of rearwardly extending legs 22 (FIGS. 1, 2, and 9-10). The legs 22 are adapted to straddle the digging edge 23 of an excavator and be welded in place. However, the mounting end could be different to attach the adapter in other ways, such as by a mechanical attachment or being integrally cast with the digging edge. In addition, especially in large teeth, the adapter could be attached to a second adapter or the like, which is then secured to the digging edge.

The nose is generally wedge shaped and formed by converging walls 24, 26, sidewalls 28, 30, and a front bearing surface 32. Bearing surface 32 is adapted to receive axially directed loads applied to the wear member 12. The converging walls 24, 26 are preferably formed with a gentle transverse curve for enhanced strength and durability (FIGS. 3 and 8), although they could be flat, provided with a greater curvature, or formed with another configuration. The sidewalls 28, 30 extend in generally parallel planes, although preferably with a slight taper. However, the sidewalls could be formed with a substantial inclination if desired. The transition edges between the converging walls and the sidewalls are generally rounded to minimize the concentration of stress at these locations.

The sidewalls 28, 30 of the nose 18 are each formed with a flank 34 and a rail 35 having an outer surface 36 and a lateral surface 37 (FIGS. 2, 3, 4 and 9). In one preferred construction, while the rails 35 extend rearward in substantially parallel planes (i.e., with the rearward extension of the sidewalls), they diverge from each other as they extend rearward. Specifically, one rail 35a extends from bearing surface 32 in a rearward direction that is substantially parallel to the rearward extension of converging wall 26, and one rail 35b extends rearwardly from bearing surface 32 in a direction that is substantially parallel to converging wall 24. In this way, the rails 35a and 35b diverge in generally vertical directions as they extend rearward. The rails are preferably formed with linear faces and generally constant depths and widths, primarily for easier manufacturing. However, other configurations are possible.

In a preferred construction, one rail extends adjacent and substantially parallel to each converging wall 24, 26. Accordingly, an outside edge of each converging wall 24, 26 defines the top or bottom of the adjacent rail while lateral surface 37 extends generally parallel to the rearward extension of the converging wall. Nevertheless, variations are possible. For example, the lateral surfaces may have a non-linear shape or an extension that is not parallel to the converging wall. Further, the rails may be spaced from the converging walls such that they could have a second lateral surface (not shown) apart from the converging walls 24, 26.

Figure 3:
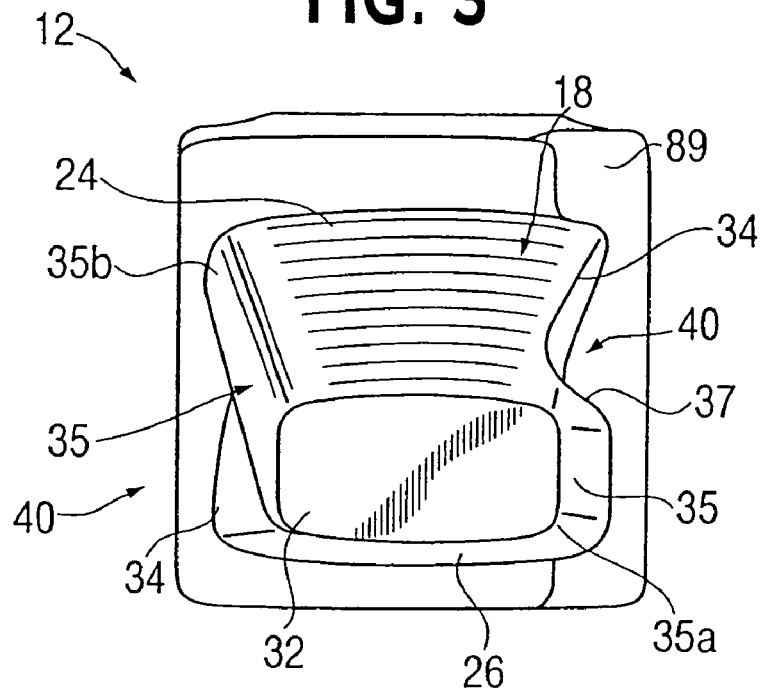
FIG. 3 is a front elevational view of an adapter for the tooth system.
Figure 4:
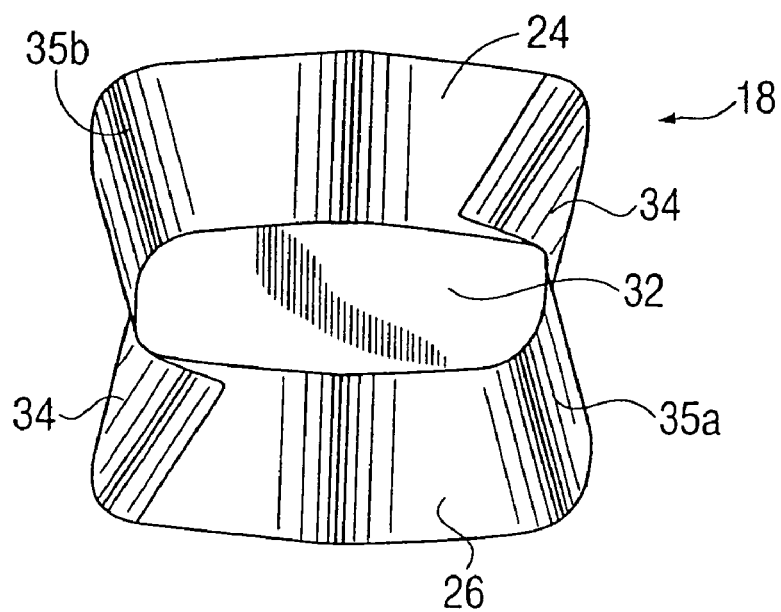
FIG. 4 is a front view of the adapter nose only with the front bearing surface parallel to the plane of the view.
Figure 8:
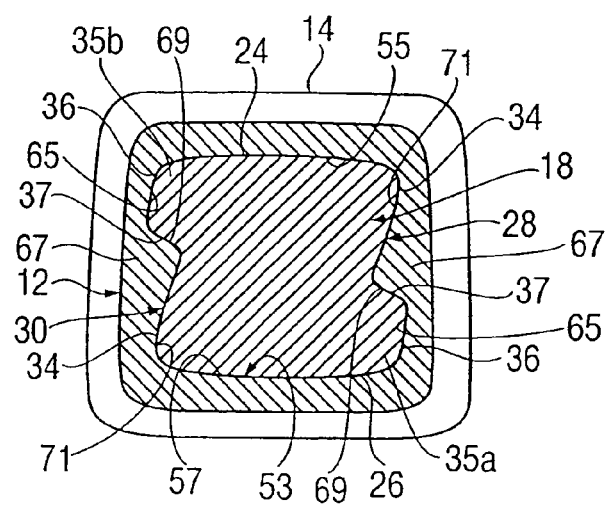
FIG. 8 is a cross-sectional view of the tooth system taken along line 8-8 in FIG. 7.

The outer surface 36 of each rail 35 is substantially vertical. Preferably, the lateral surface 37 and flank 34 are inclined to form a generally V-shaped recess 40 (FIGS. 3 and 8). Accordingly, the lateral surface 37 and flank 34 each present a surface area that is transverse to vertical to form primary bearing surfaces for vertical and lateral loads applied to the point 12. The converging walls 24, 26 form secondary bearing surfaces that may contact the socket under heavy loading or after wearing of the parts. Each lateral surface 37 is preferably set at an angle of 75 to 115 degrees relative to its respective flank 34, and most preferably at an angle of 95 degrees. Nevertheless, other angles could be used. The flanks 34 are generally triangular in shape such that they expand as they extend rearward to form an increasingly greater portion of each sidewall 28, 30.

The point 12 has a generally wedge-shaped configuration defined by converging walls 43, 45 and sidewalls 47, 49 (FIGS. 1-10). The converging walls 43, 45 narrow to form a forwardly projecting digging edge 51. A rearwardly opening socket 53 is provided to receive the adapter nose 18.

Figure 5:
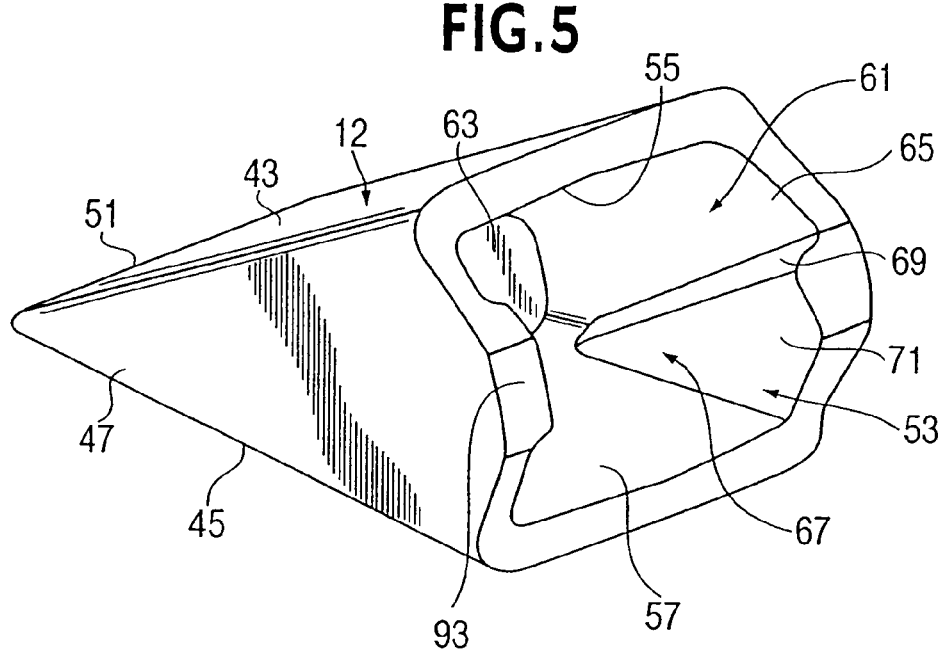
FIG. 5 is a rear perspective view of a point for the tooth system.
Figure 6:
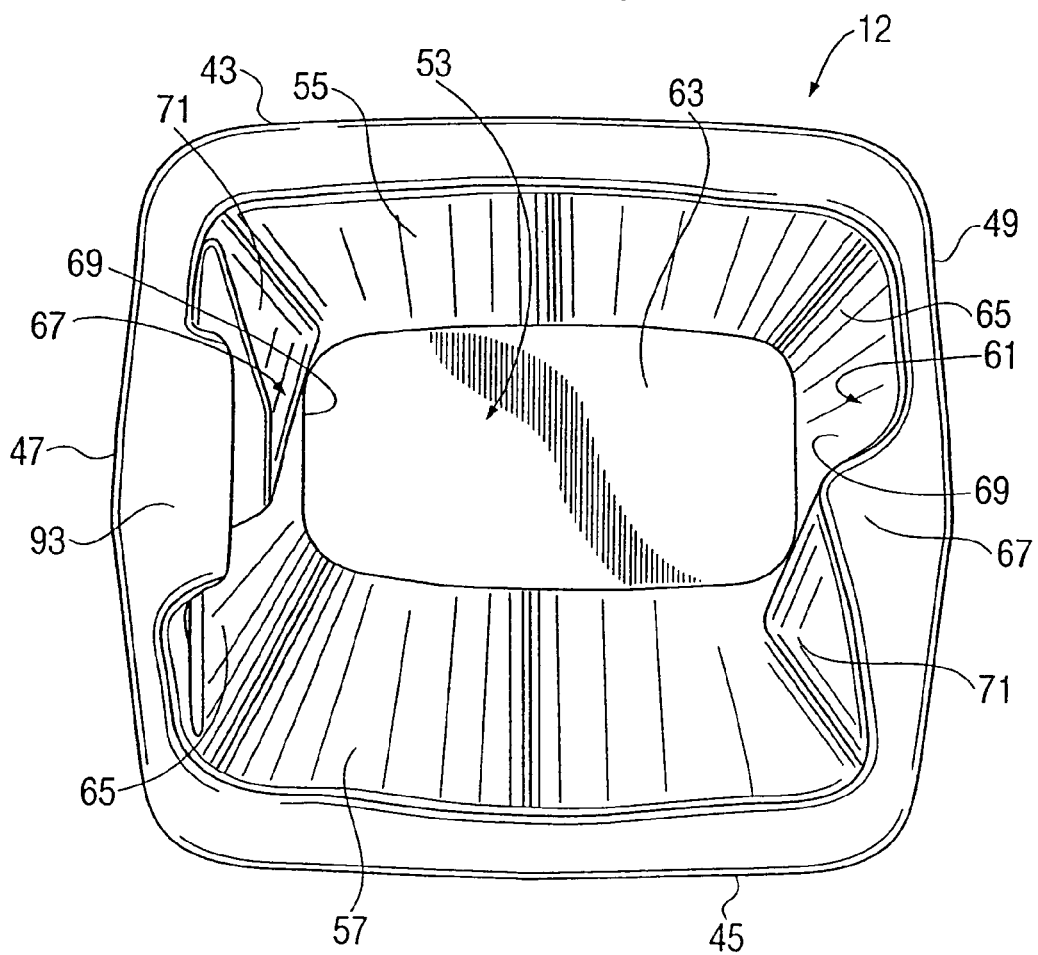
FIG. 6 is a rear elevational view of the point.
Figure 7:
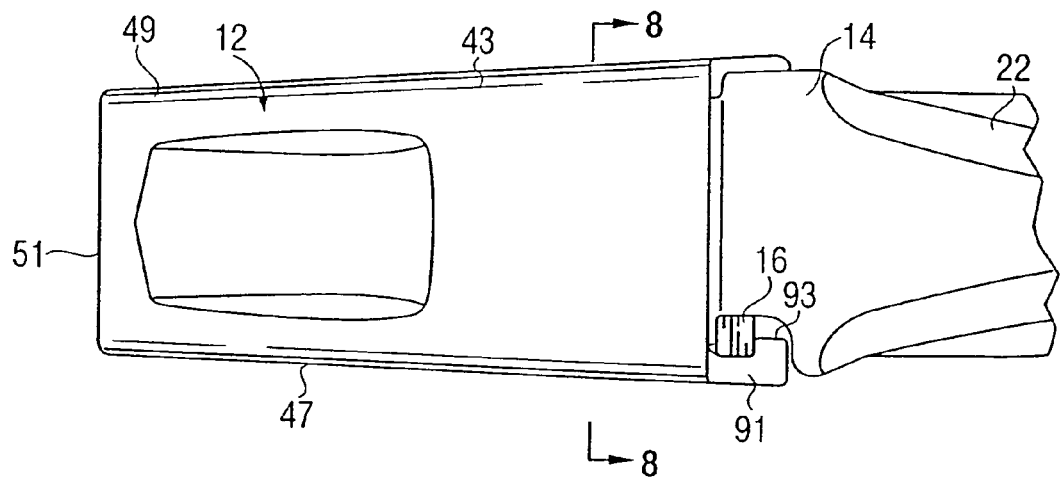
FIG. 7 is a partial, top view of the tooth system.

The socket 53 is preferably shaped to matingly receive the adapter nose 18 (FIGS. 5, 6 and 8). Accordingly, the socket is defined by converging surfaces 55, 57, side surfaces 59, 61, and a front surface 63. Each side surface 59, 61 is formed with a groove 65 and an inwardly projecting ridge or protrusion 67. The grooves 65 are shaped to receive the rails 35 on the adapter nose. Hence, in the preferred construction, the grooves 65 are preferably formed to extend along opposite converging surfaces 55, 57. The protrusions 67 each define a lateral surface 69 and an inner surface 71 that oppose and bear against lateral surface 37 and flank 34, respectively. Hence, lateral surface 69 and inner surface 71 form primary bearing surfaces for generally vertically applied loads, whereas the converging surfaces 55, 57 form secondary bearing surfaces that may contact the nose under heavy loading or after wearing of the parts. The front surface 63 is adapted to abut bearing surface 32 during axial loading.

While the nose is preferably on the adapter and the socket in the point to minimize the amount of metal needed in the wear member, a rearwardly extending nose could be provided on the point to be received in a socket defined in the adapter. Also, the socket and nose constructions could be reversed so that internal rails (not shown) could be provided in the socket with mating grooves provided on the nose (not shown).

Figure 9:
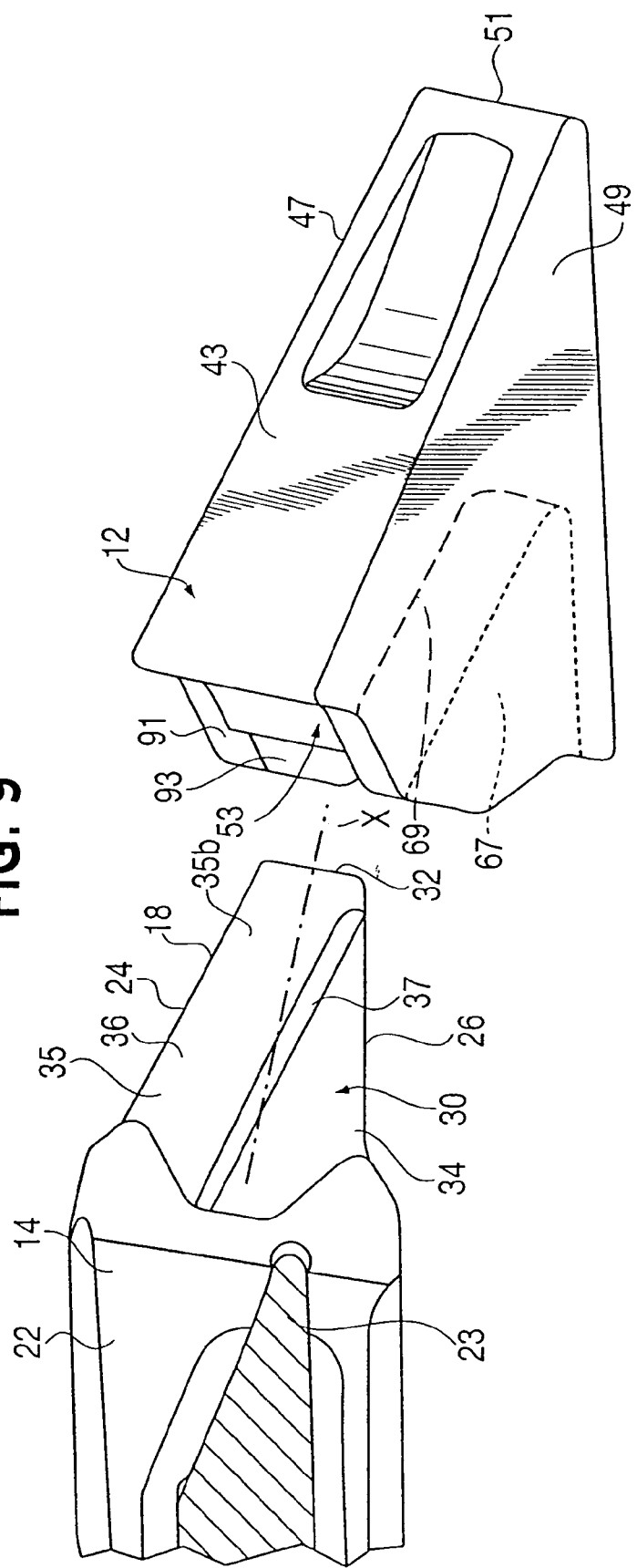
FIG. 9 is a side elevational view of the point positioned for mounting onto the adapter nose.
Figure 10:
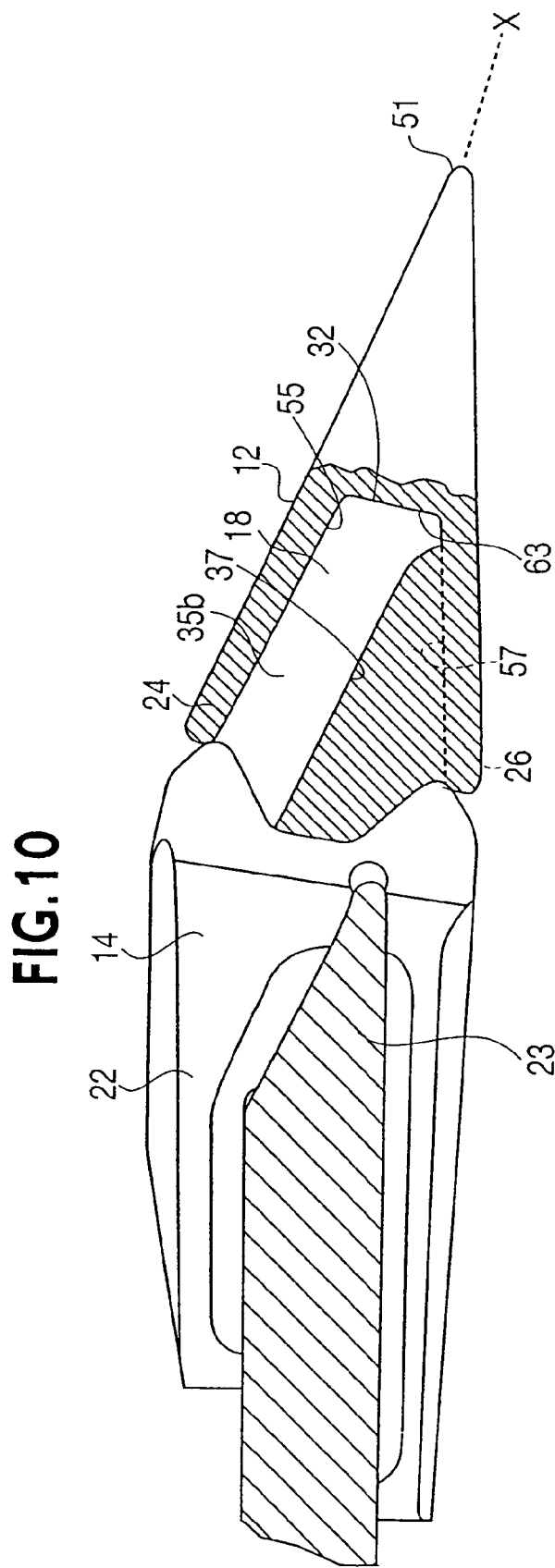
FIG. 10 is a partial cross-sectional view of the point mounted onto the adapter.

On account of the diverging rails 35 and grooves 65, the point 12 must be turned or rotated as it is fit onto the adapter nose 18. In the preferred construction, the point rotates on the order of an eighth of a turn as it is installed. As a result, the point fits onto the adapter nose in much the same way as if the point and adapter were formed with helical threads rather than with straight rails and grooves. The point 12 is mounted to the nose 18 by first orienting the point 12 with respect to the nose 18 so that the rear portion 73 of each groove 65 is located adjacent to the front portion 75 of a corresponding rail 35 in order to receive the rail, as shown in FIG. 9. Because the grooves are vertically diverging, the aligning of the front end of the rails with the rear end of the grooves causes the point to be rotated relative to its final position. Hence, as the point is slid onto the nose, the point is rotated about longitudinal axis X to provide ample clearance for the rails, ultimately causing the rails 35 to be inserted into the respective grooves 65. FIG.

10 shows the point 12 mounted on the nose 18 with the rails 35 fully inserted into the grooves 65 of socket 53.

The present invention thus achieves certain advantages provided by the earlier wear assemblies provided with helical threads (e.g., U.S. Pat. No. 4,353,532), but with a simpler and less expensive geometry to manufacture. The opposing rails of the present invention are easier to cast than the helical thread assemblies. In addition, the use of larger rails and grooves instead of sharper helical grooves lowers the stress risers in the nose for enhanced strength and durability.

The present invention also achieves other advantages over the conventional helical thread assemblies. The present invention does not use a conical base for the nose, but rather uses a more slender profile wedge shape. Thus, the height of the nose (between the top and bottom surface) is not restricted by a conical base, and therefore the height of the nose may be adjusted according to need. The nose of the present invention may therefore be used to form tooth systems with more slender profiles than those provided with helical threads. The more slender profile tooth system provides for better penetration during digging and requires less metal to make.

In addition, the degree of twist can be varied by changing the angle defining the divergence of the rails. In general, the greater the angle, the greater the amount of twist the point undergoes during installation and removal.

Figure 11:
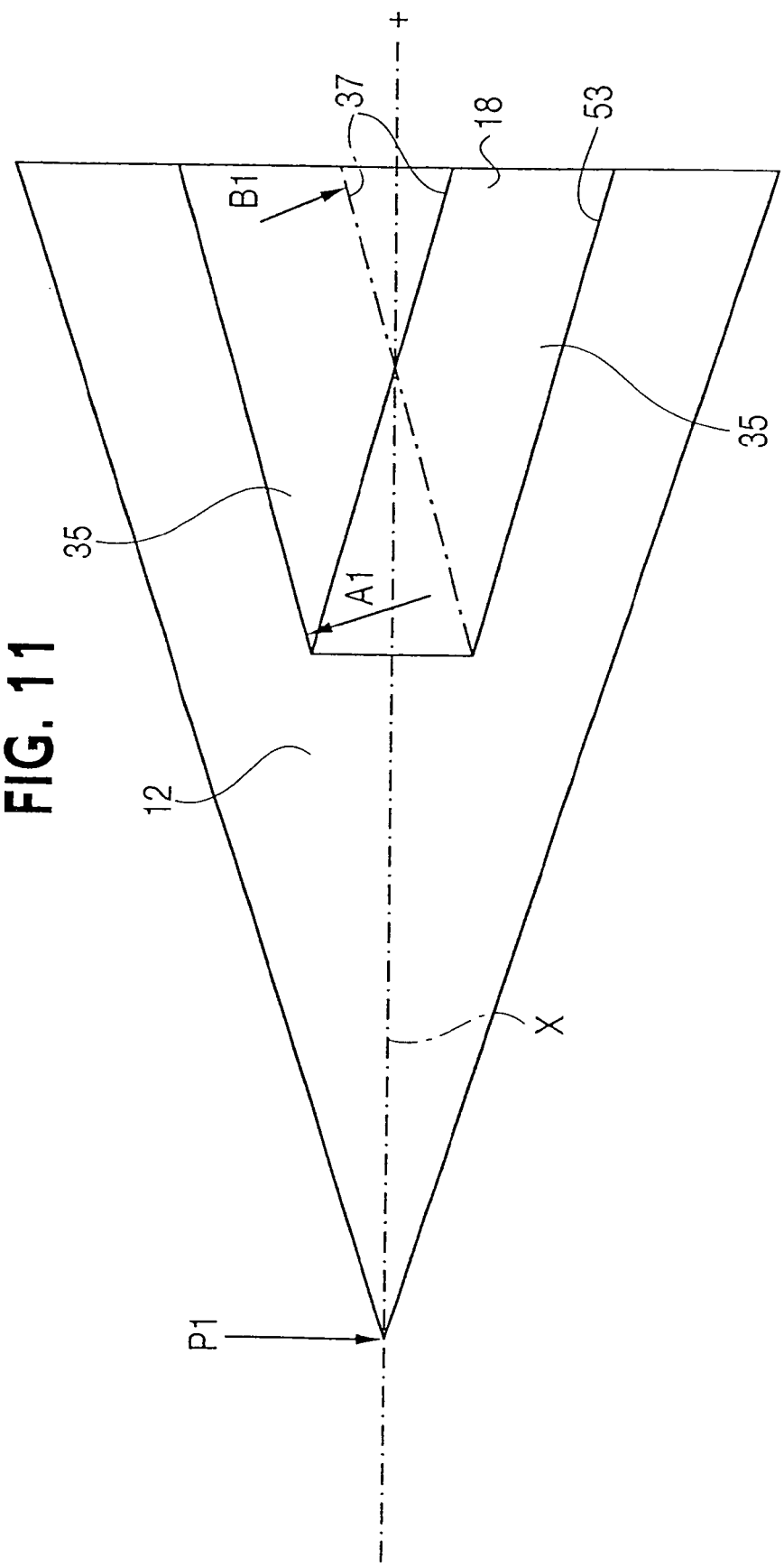
FIG. 11 is a vector force diagram of the tooth system in accordance with FIGS. 1 and 2.

With this construction, the point 12 is stably positioned on the adapter nose 18. As compared to a conventional tooth, a centrally applied vertical load P1 on the free end 51 of the point 12 generates a smaller ejection force on account of the horizontal components of the reaction forces A1 and B1 (FIG. 11). For example, a central downward load P1 on the free end 51 of the point 12 generates reaction forces A1 and B1 at the tip and base of the nose 18. The vertical component of reaction force A1 is generally the same as the load P1 plus the vertical component of reaction force B1. However, because the inclination of the rail 35 resisting the upward motion of the rear or base end of the point is in the opposite direction to the lower converging wall 45, the horizontal component of reaction force B1 is rearwardly directed to push the point onto the adapter rather than eject it. This holding or tightening force then at least partially offsets the ejection force due to the horizontal component of reaction force A1. While loads with vertical components applied to different parts of the point 12 may not always create the noted tightening force, the effect will occur under normal loads for a significant advantage.

Figure 12:
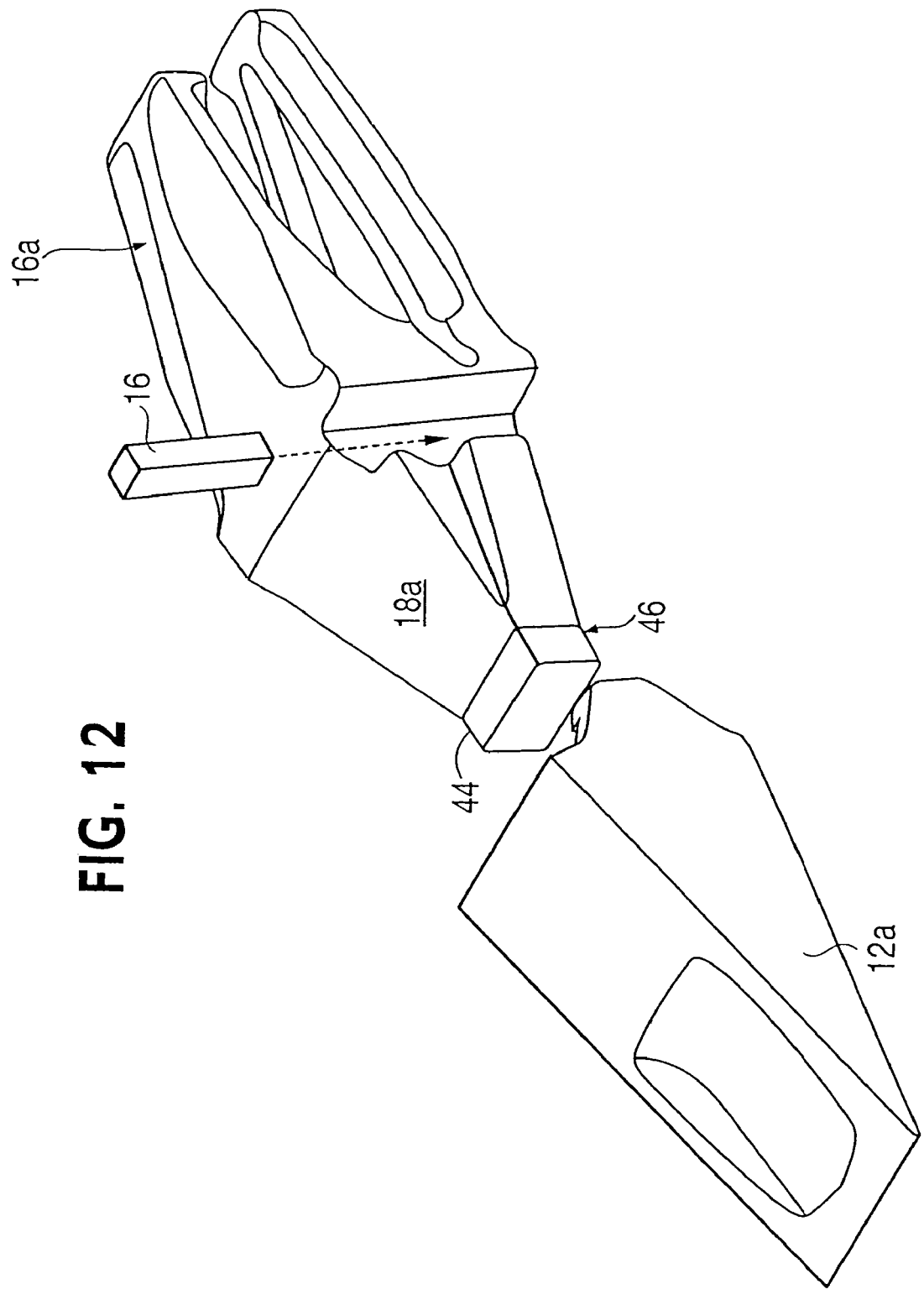
FIG. 12 is a perspective view of an alternative embodiment of a tooth system in accordance with the present invention.
Figure 13:
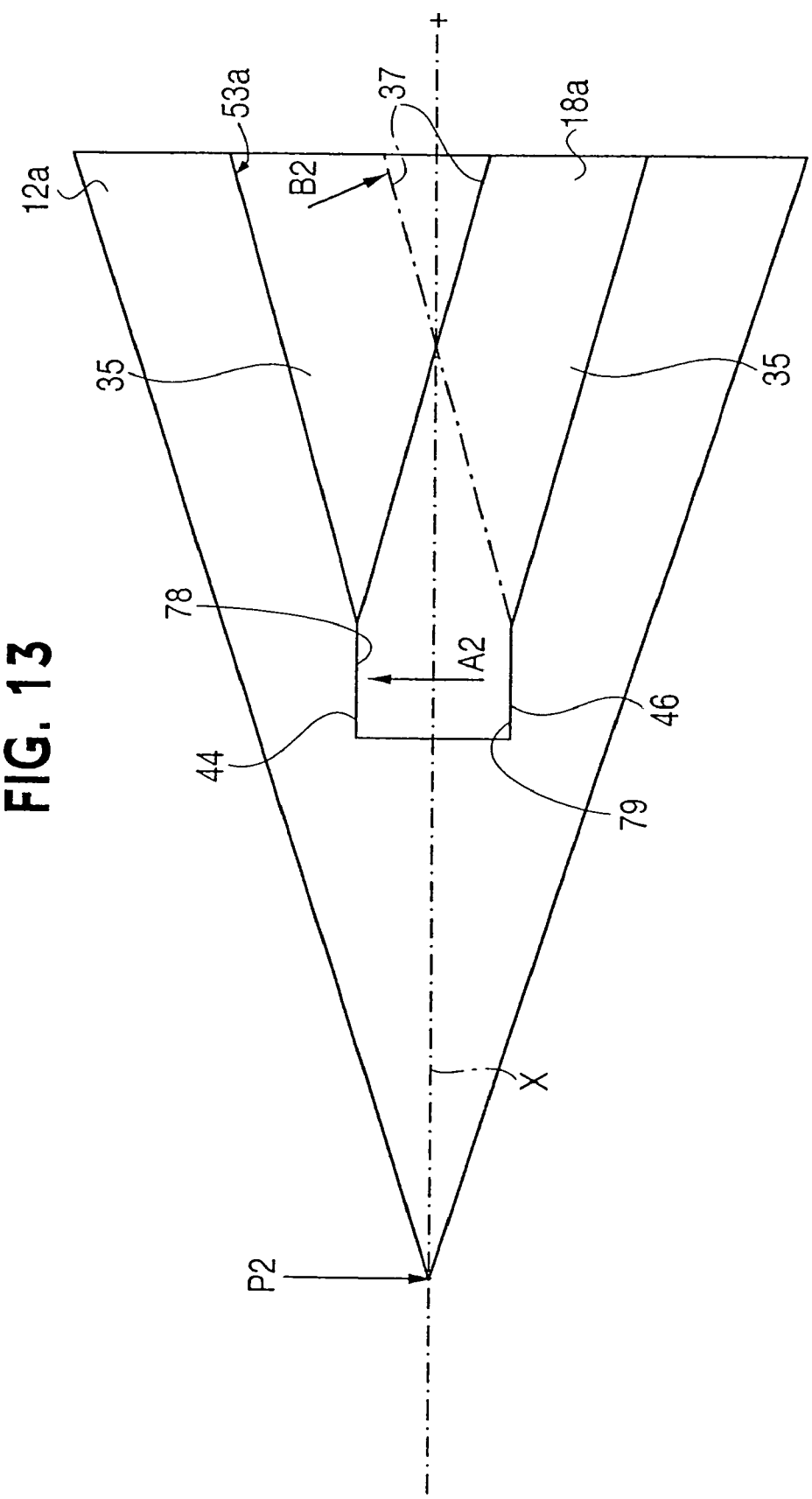
FIG. 13 is a vector force diagram of the tooth system in accordance with FIG. 12.
Figure 16:
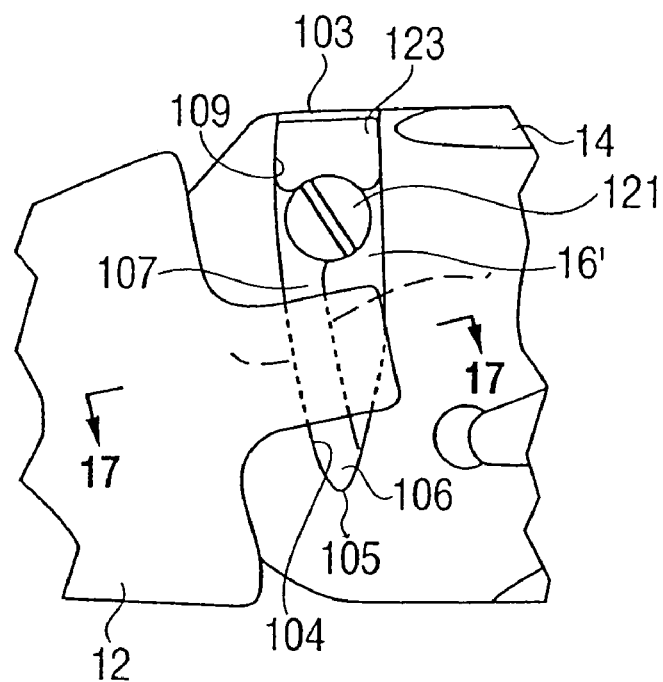
FIG. 16 is a partial side view of the second tooth system with the alternative lock in its locking position.
Figure 17:
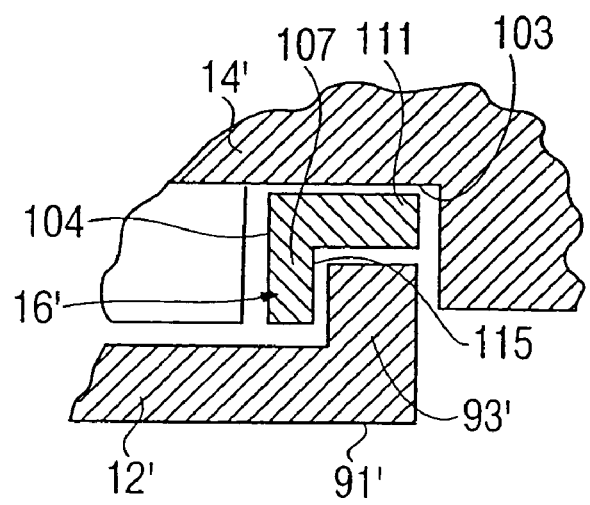
FIG. 17 is a partial cross-sectional view taken along line 17-17 in FIG. 16.
Figure 18:
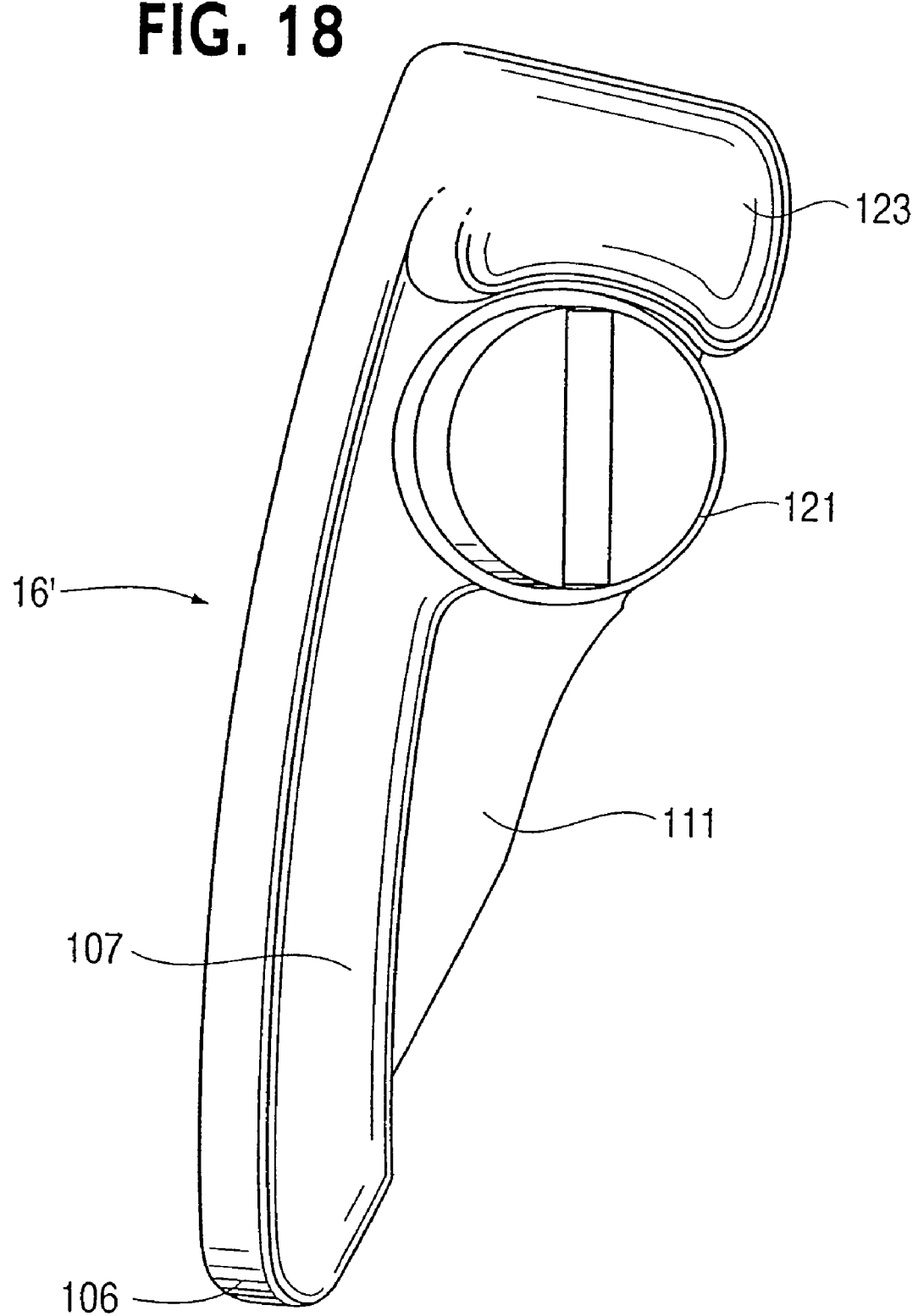
FIG. 18 is a perspective view of the alternative lock.

In another preferred construction, the front free end 42 of the nose 18a is formed to have a generally rectangular configuration with upper and lower stabilizing flats 44, 46 (FIGS. 12 and 13). These flats 44, 46 extend substantially parallel to the longitudinal axis of the tooth to provide further support for stabilizing the point on the adapter, particularly in resisting vertically directed loads on the front end of the point 12a. The substantially parallel flats may be inclined to the longitudinal axis for up to about seven degrees for drafting purposes. While the flats may be inclined at greater angles, their stabilizing function tends to decrease with an increasing inclination. The socket 53a of point 12a includes a pair of front end stabilizing flats 78, 79 that engage flats 44, 46 on the adapter nose 18a. The front end of the socket is preferably given a generally rectangular configuration to mate with the front end of the nose, although shapes other than rectangular for the front ends of the nose and socket are possible.

In the preferred tooth system 10a, a centrally applied downward load P2 on the free end of the point 12a creates a substantially vertical reaction force A2 with generally no horizontal component acting as an ejection force (FIG. 13). As discussed above, the inclination of the rails generate a horizontal component with a holding force at the base end of the point rather than an ejection force. Hence, with this loading the overall effect of the bearing surfaces (i.e., the flats and the rails) is to tighten the point on the adapter rather than eject it.

This construction provides a substantial improvement in point stability. The generation of the resultant tightening forces will lessen loading on the lock pin and reduce the risk of point loss. The resultant tightening forces will also tend to reduce the movement of the point on the adapter nose, which in turn will reduce the wearing of the tooth construction. Moreover, because the system is tightened while under most predominant or normal vertical and axial loading, the manufacturing tolerances can be loosened for easier and less expensive manufacturing, the use of take-up style lock pins (with load bearing elastomers) can be eliminated, and gauging requirements can be reduced without shortening the useful life of the tooth. Instead, the tooth will have enhanced durability.

Figure 22:
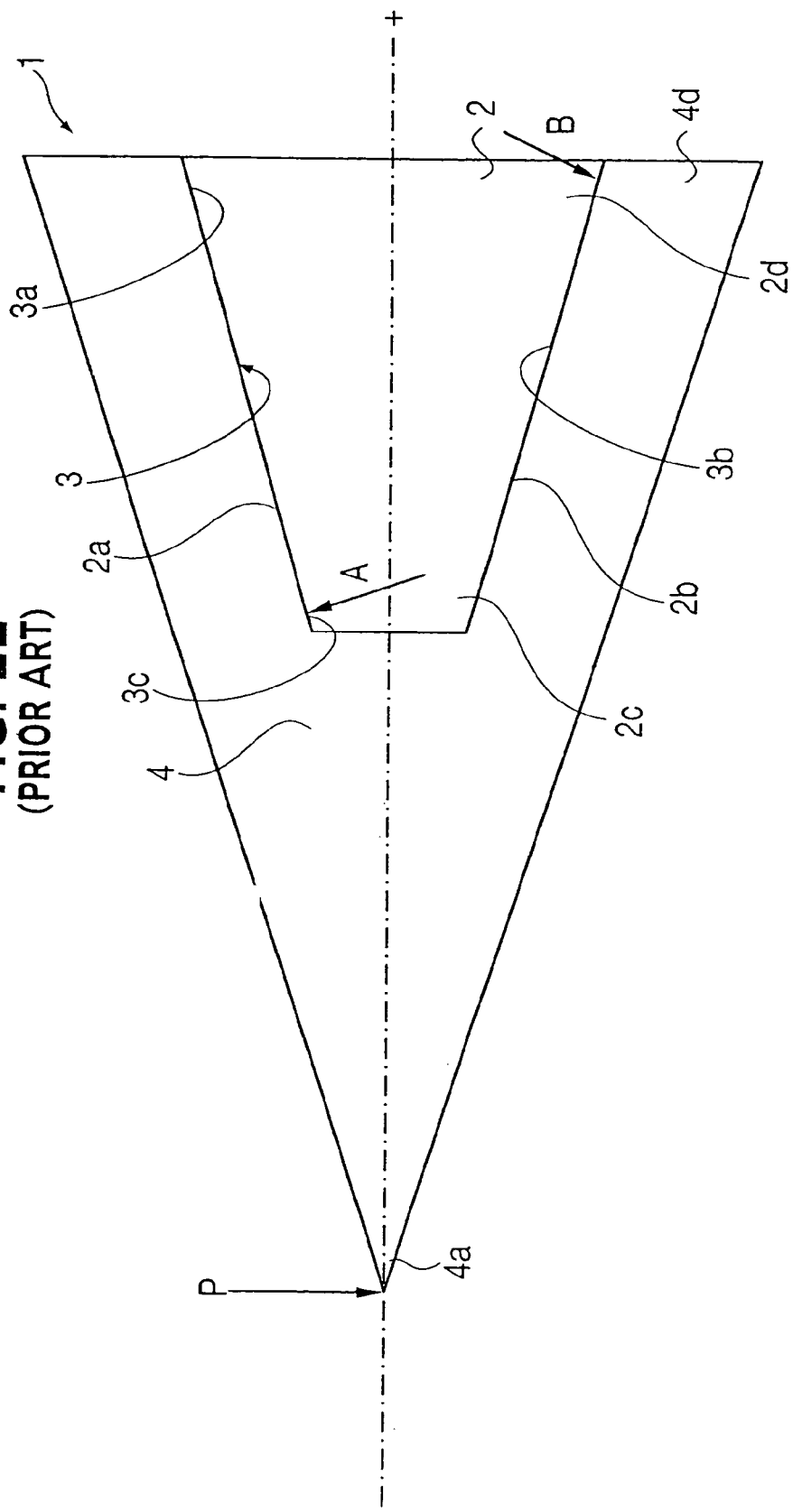
FIG. 22 is a vector force diagram of a conventional tooth system.
Figure 23:
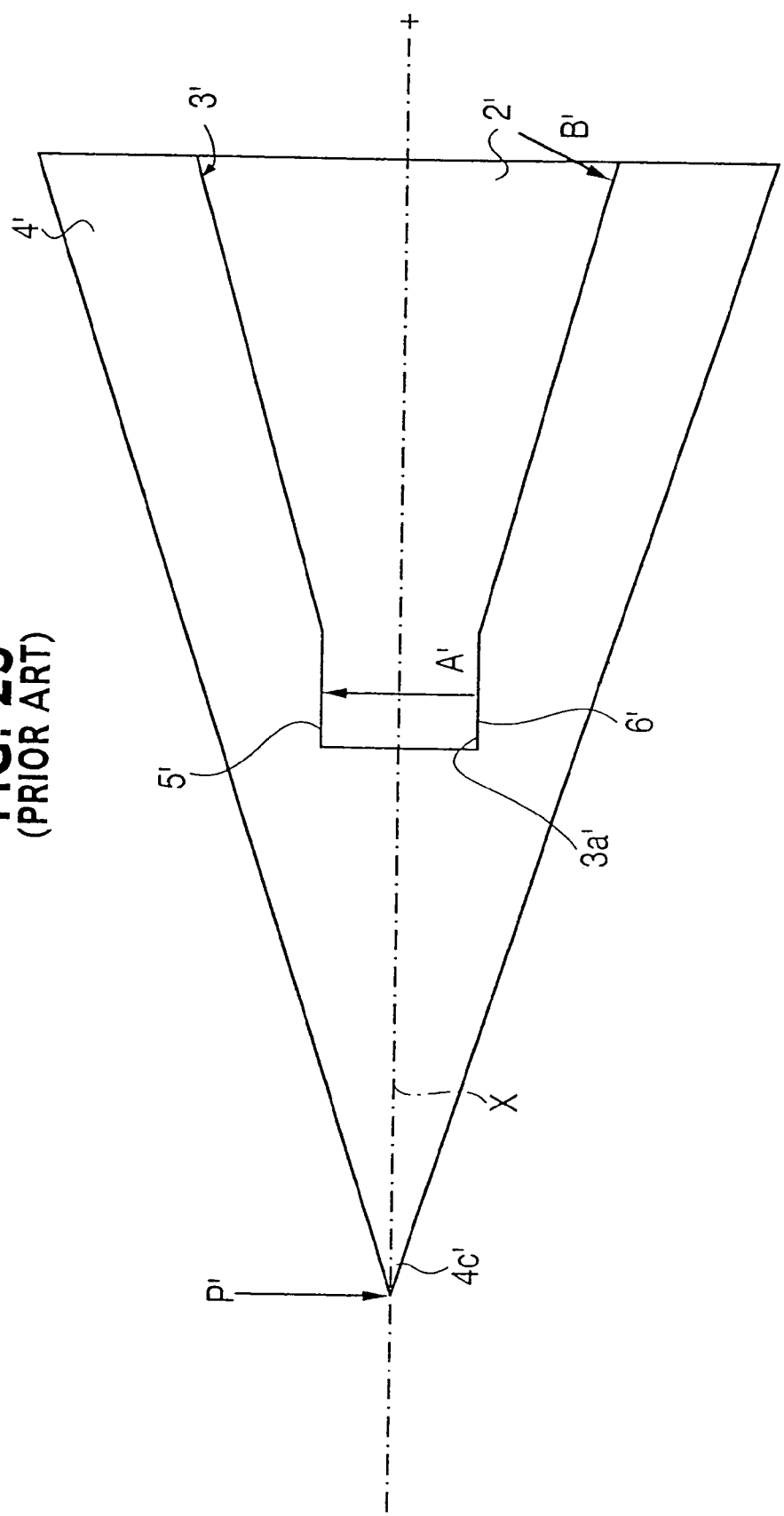
FIG. 23 is a vector force diagram of another known tooth system.

In a conventional tooth system (see FIG. 22), the extreme fibers of the upper and lower converging walls 2a, 2b of the nose 2 (i.e., those surfaces spaced vertically farthest from the longitudinal axis) tend to have high stress levels under vertical loading because of the tendency of such loads to bend the nose. In conventional teeth, the outer converging surfaces form the primary bearing surfaces as well as undergoing the highest stress levels. As a result, these surfaces move and rub against the socket walls and experience a high degree of wearing under heavy loading. In the present invention, the rails 35 and flanks 34 form the primary bearing surfaces. Since the bearing surfaces are closer to the central horizontal plane of the tooth system, wearing of these surfaces has less affect on the ability of the nose to withstand high bending loads than wearing of the outer converging walls. With less wearing, the tooth system of the present invention is a stronger and more durable assembly. As a result, a smaller tooth system made in accordance with the present invention, which requires less metal and has better penetration, can replace bigger conventional tooth systems. Moreover, this reduction of wear in the extreme fibers will enable the section modulus to remain nearly the same throughout the life of the nose to maintain nose strength.

As an alternative, because of the rotation used to install and remove the tooth system, the front end of the nose and corresponding socket can actually be wider than the rear end of the nose; that is, the sidewalls can be tapered to diverge slightly at an angle up to about 5 degrees as they extend forward. This expansion of the nose and socket widths at the front of the nose will tend to restrict the paths for removing the point from the nose to the designed rotation even as wearing occurs. As a result, this construction provides increased resistance to forces tending to remove the point and especially reverse forces.

As another alternative, the nose can be provided with longitudinally extending rails 80 that include outer faces 81 and lateral bearing faces 83 (FIG. 14). The lateral bearing surfaces 83 are generally parallel to each other and to the longitudinal axis X of the tooth. In these arrangements, the depth of the rails preferably increases as the rails extend rearward; that is the converging walls of the nose form the upper or lower surfaces of the respective rails 80 even though the lateral surfaces 83 extend rearwardly in an orientation that is generally parallel to the longitudinal axis of the tooth. Nevertheless, the rails could have a constant depth and simply be spaced from the respective converging wall. Without the divergence of the rails, the point is not rotated onto the adapter nose. While some of the benefits for having the point turn as it is installed and removed do not apply to this embodiment, the rails still continue to provide a stabilizing surface (as compared to the conventional tooth system) that reduces the stresses in the extreme fibers of the converging walls and, as discussed above, reduces the wearing of the bearing faces on resisting the bending forces. The use of only two rails that form a generally Z-shaped cross section improves the noted loading and wearing benefits for a reduced amount of material. This embodiment can further be used when twisting of the point during installation is not desired or possible. As one example, the points could be welded to a plate and the assembly then mounted collectively to the projecting adapter noses along the digging edge.

In regard to all of the embodiments, the nose and points are preferably formed to be rotationally symmetrical about the longitudinal axis X so that the points can be reversibly mounted on the nose. Nevertheless, asymmetrical nose and/or points could be used in this invention.

Figure 2:
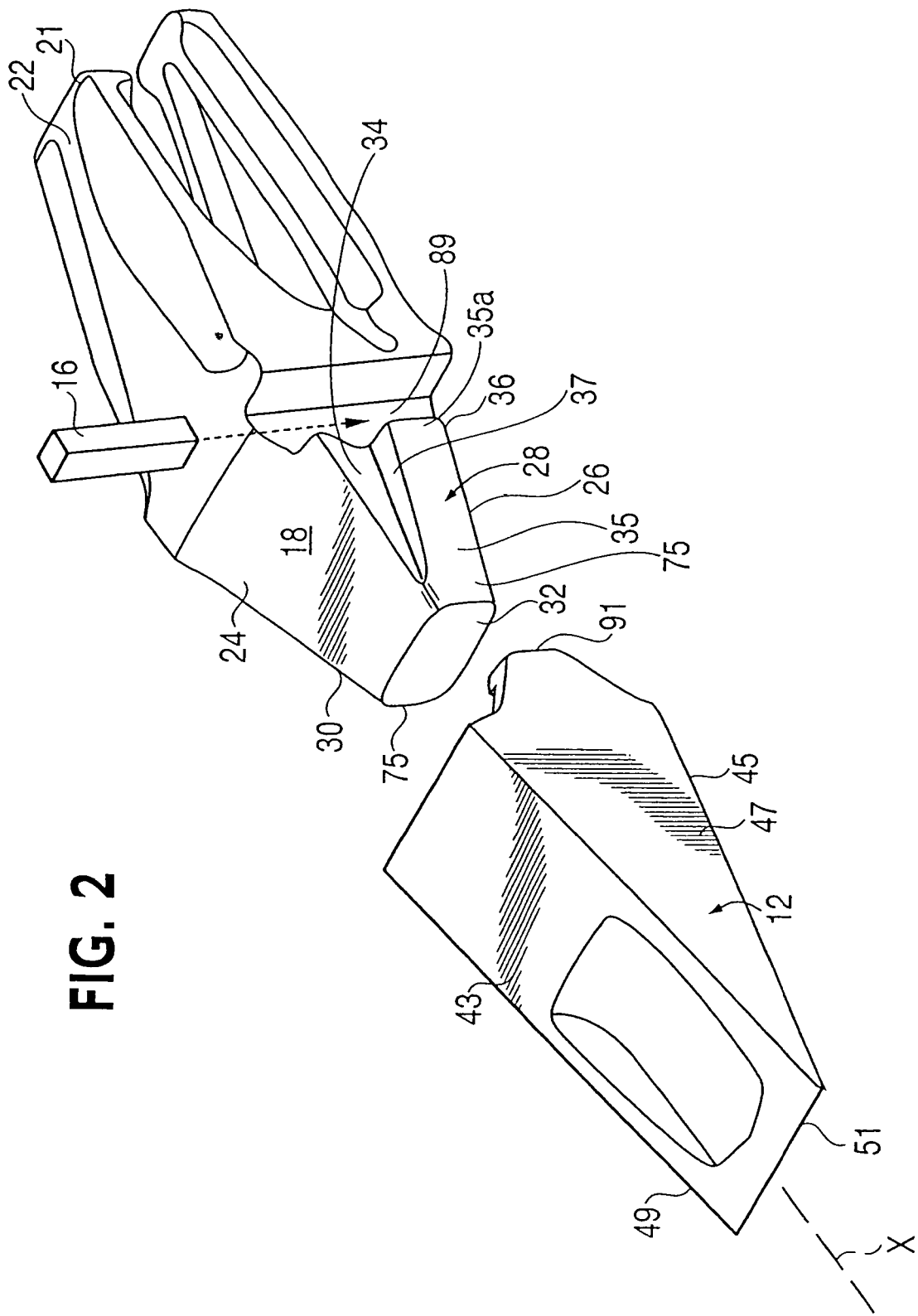
FIG. 2 is an exploded perspective view of the tooth system.

The point and adapter assembly of the present invention can be used with a wide variety of different locks to resist removal of the point from the adapter. Because the lock 16 withstands compression forces at least partially in lieu of shear forces (and thus experiences reduced shear loading) in resisting the ejection of point 12 from nose 18, the lock need not be as robust as locks used with other conventional point and adapter assemblies applying substantially only shear loads on the locks. The placement of the lock 16 is preferably along one side of the nose 18, as shown in FIGS. 1 and 2. However, a lock could be provided at other locations including a vertical or horizontal central passage (such as in conventional tooth systems). Further, virtually any conventional lock used to secure points to the adapters including solid lock pins, pins with take-up elastomers, or locks with rigid casings such as disclosed in U.S. Pat. No. 5,469,648 to Jones et al. could be used in conjunction with this invention.

FIG. 2, for example, shows a lock 16 in the form of a drive through lock pin that is received in a vertical channel 89 in the side of the nose. As is known, the point is provided with at least one rearwardly extending ear 91 having an inwardly extending lug 93 to engage the rear side of the pin and retain the point to the adapter. Preferably, an ear and lug is provided on both sides of the point (not shown) so that the point can be reversible mounted in either of 180 degree positions. While the channel and pin are shown with a linear configuration, they could be curved as in U.S. Pat. No. 4,965,945 to Emrich.

In the preferred construction, a tapered locking pin 16' is provided to secure the point to the adapter. Referring more particularly to FIGS. 15-18, a nose 18' has a tapered vertical channel 103 along one side for receiving a tapered locking pin 16'. Although the lock can be tapered along its entire length, it only needs to be tapered along a substantial portion of its length. In the preferred construction, the front surface 104 gradually arcs rearward the entire length of the lock so that the taper extends along substantially the entire length of the lock. FIG. 15 shows a blind channel that extends only partially through the nose and tapers to a closed end 105 at the bottom. Nevertheless, an open channel that extends entirely through the adapter could be used with the tapered pin if desired.

The locking pin 16' has a corresponding tapered shape to fit within the tapered channel 103 (FIGS. 15-18). The locking pin 16' preferably terminates in a narrow point 106. The pin 16' has a bearing portion 107 that has a front surface 104 for engaging the shoulder 109 of the nose (i.e., the front edge of channel 103) and a rear surface for engaging the lug 93' of the ear 91'. In the embodiment shown in FIGS. 15-18, the locking pin 16' has a web 111 that extends rearward to strengthen the lock against axial forces and ensure proper insertion of the lock pin. However, the lock pin could have a uniform circular, rectangular or other shape as desired.

The nose 18' defines a slot 113 in communication with the channel 103 to allow the lug 93' and ear 91' to pass along the side of the nose to a position within the channel. The pin 16' defines a recess 115 behind the rear surface 107 and proximate to the web 111 for receiving a portion of the lug 93'. The locking pin 16' may be formed from any conventional method, such as by casting.

The lock pin 16' is preferably retained in the channel 103 through the use of a locking member. In the embodiment shown in FIGS. 15-18, the locking member is a set screw 121. The channel 103 preferably includes an indent 125 for receiving the set screw to better retain the locking pin in the channel 103, but the indent is not required. Once the lock pin 16' is installed in the channel 103, the set screw 121 is tightened. The set screw 121 may be upset at the end or provided with a retaining ring or other means to prevent the set screw from becoming disassociated from the lock pin. The lock pin preferably includes an overhanging shelf 123, which protects the set screw from wear. A spring (not shown) can also be associated with the set screw to inhibit loosening during vibration.

Figure 19:
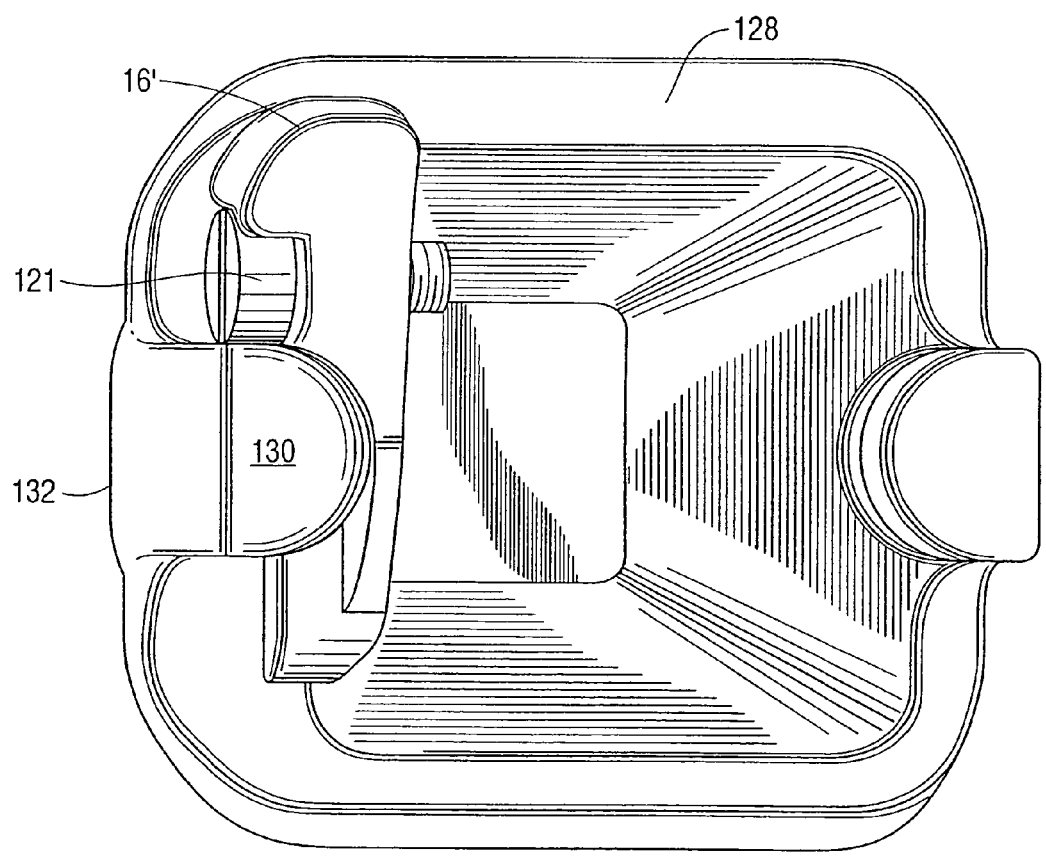
FIG. 19 is a rear view of the alternative lock engaged with a point of an alternative tooth system.
Figure 20:
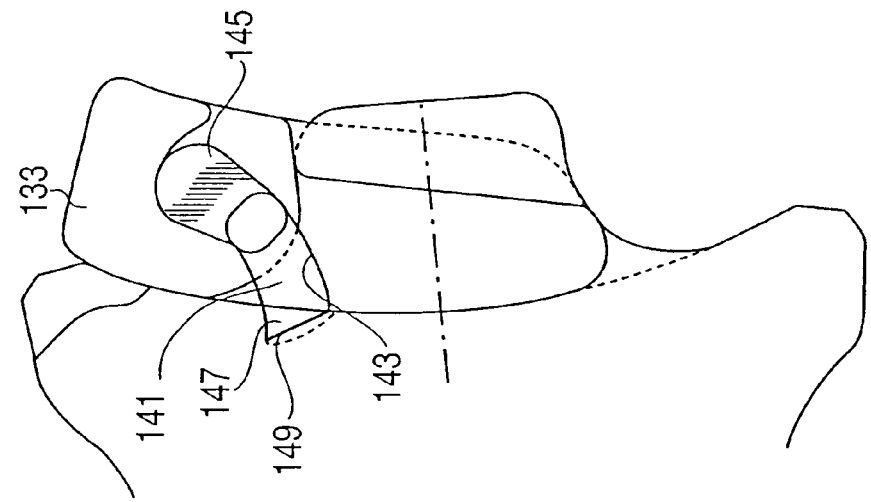
FIG. 20 is a side view of another alternative lock inserted into a tooth system.
Figure 21:
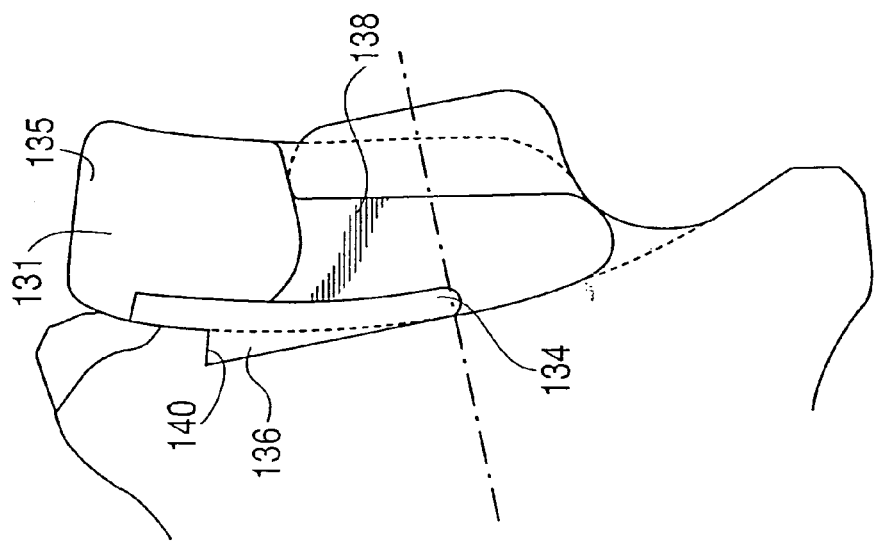
FIG. 21 is a side view of another alternative lock inserted into a tooth system.
Figure 20A:
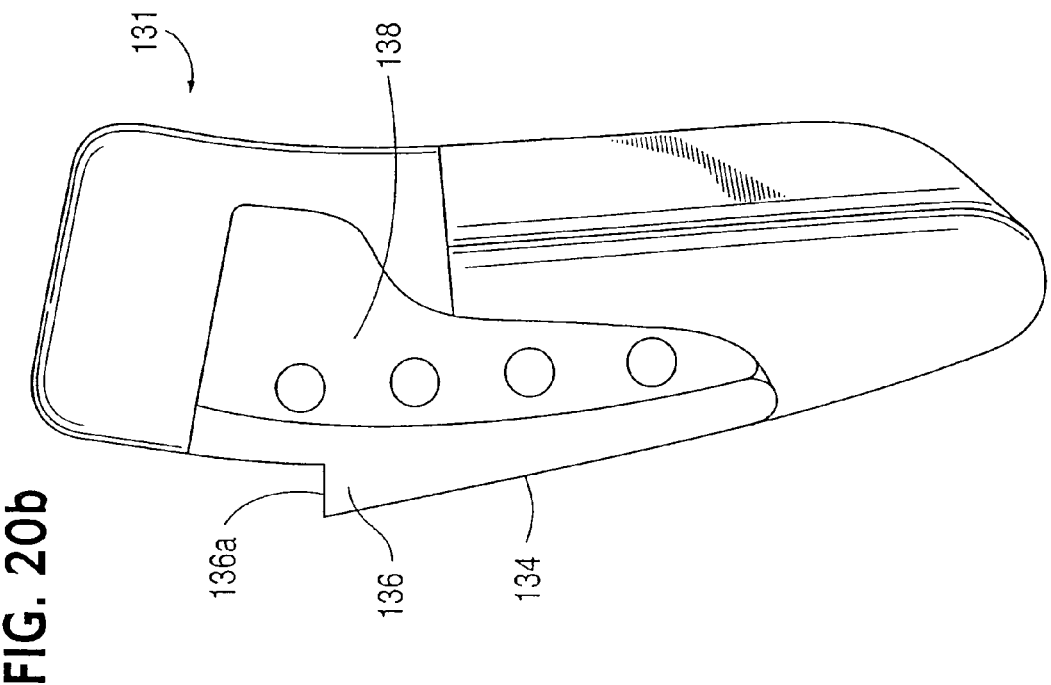
FIG. 20a is a perspective view of the lock shown in FIG. 20.
Figure 20B:
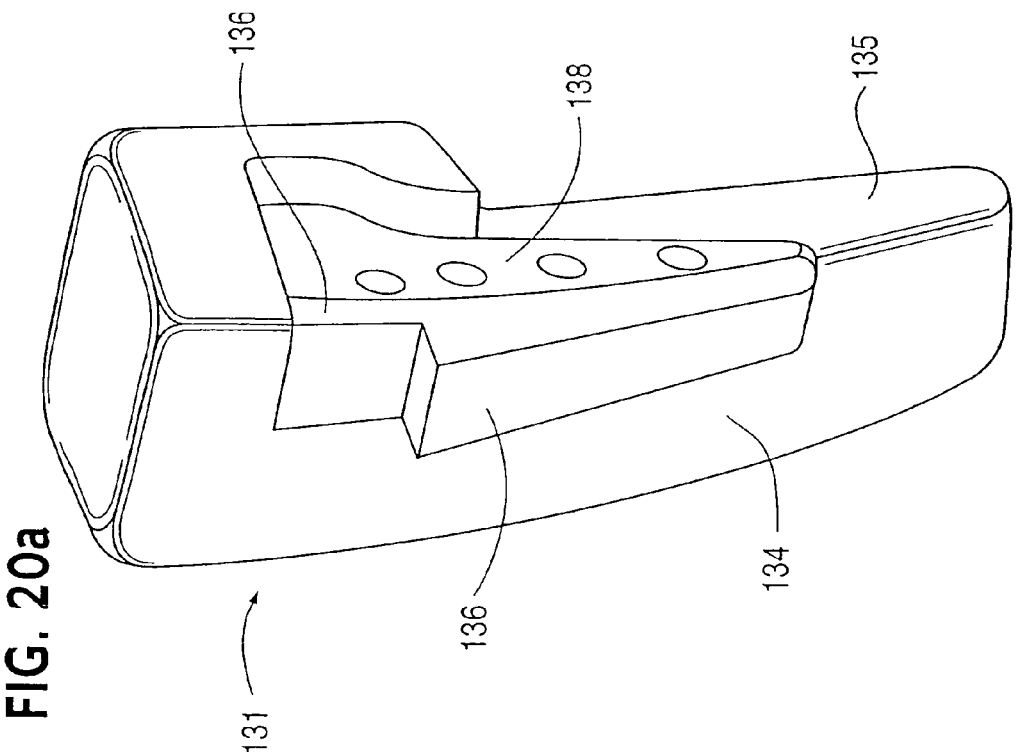
FIG. 20b is a side view of the lock shown in FIG. 20.
Figure 21A:
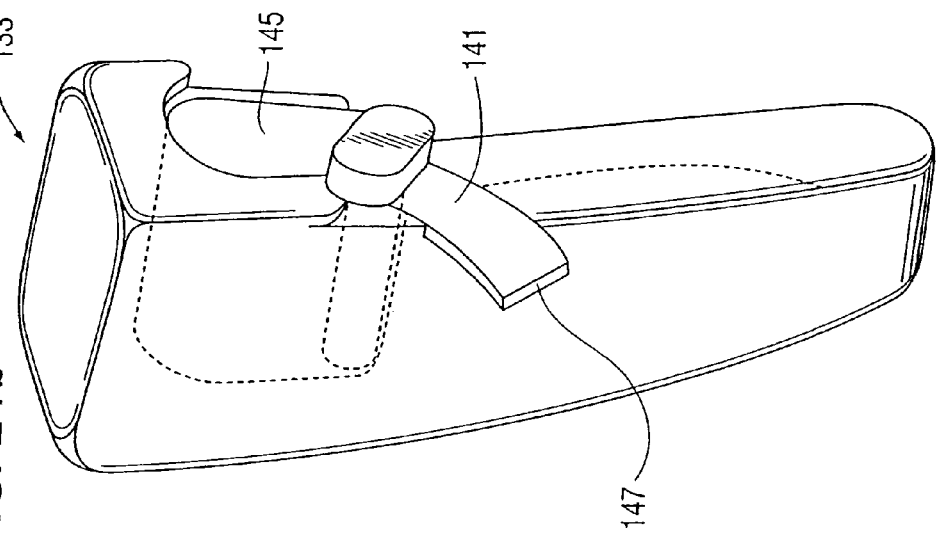
FIG. 21a is a perspective view of the lock shown in FIG. 21.
Figure 21B:
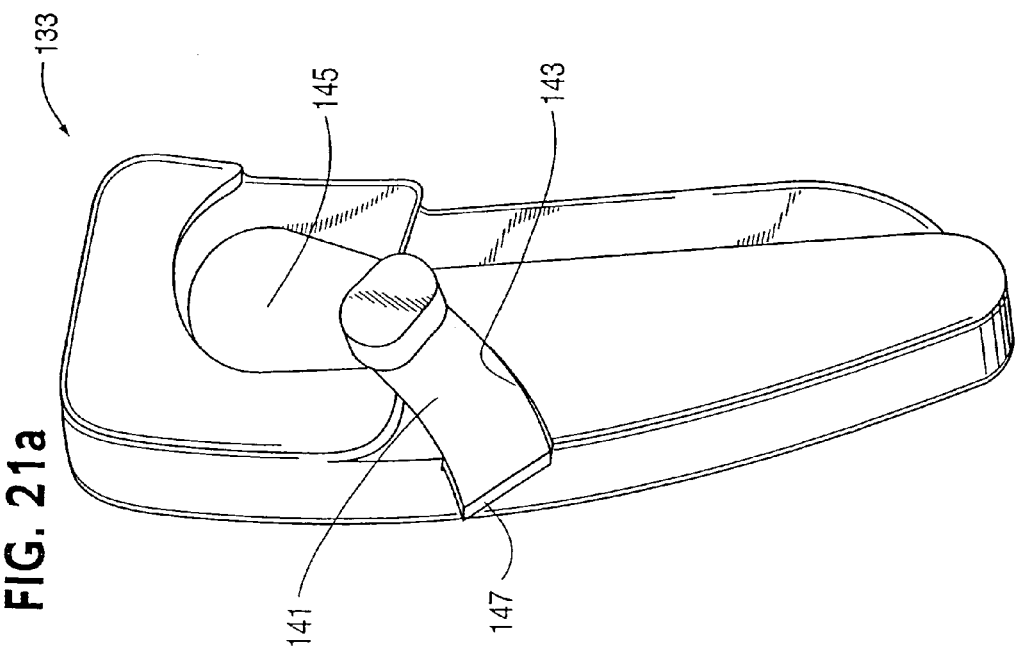
FIG. 21b is a perspective view of the lock shown in FIG. 21 with the base portions of the elastomer and detents shown in phantom.

The lock pin 16' could also be used in conjunction with other wear assemblies. For example, as shown in FIG. 19, the lock pin could be used to retain a point 128 with a simple wedge shaped socket, ears 132, lugs 130. A tapered lock pin in accordance with the present invention could also be used in tooth systems having vertical or horizontal central holes (not shown).

Alternatively, other locking members may be provided, such as an elastomer backed detent to resist removal of the pin from the groove. In addition, while the embodiment of FIGS. 15-18 shows the locking member coupling the lock pin to the adapter, the locking member may instead operably engage the locking pin to the point. In addition, the locking member need not be attached to the locking pin, but instead may be a separate member or attached to the adapter or point (see, for example, the plug in U.S. Pat. No. 4,965,945).

As examples of alternatives, lock pins 131,133 (FIGS. 20-20b, and 21-21b) have tapered constructions that could be used in place of lock pin 16'. Lock pin 131 has a detent 134 that is biased outward at one end 136 by an elastomer 138 to fit under a ledge 140 defined in the adapter nose. The detent preferably has a projecting contact surface 136a to form a secure engagement with ledge 140. The detent 134 is preferably adhered to elastomer 138 which in turn is adhered in a pocket of the cast body 135. In lock pin 133, the detent 141, is biased to move along an arcuate path 143 by an elastomer 145. The free end 147 of the detent 141 engages a notch 149 or the like defined in the adapter nose. In each case, the adapter nose includes a narrow slot (not shown) whereby a tool can be inserted to push the detents into the elastomers to release the detents 134, 141 when removal of the locks is desired.

One of the advantages of a tapered pin is that it is easier to install and remove than a conventional drive-through pin. The tapered surfaces allow the locking pin to be inserted without encountering any resistance from the surface of the point or nose until the locking pin is almost entirely inserted into the channel. The tapered locking pin may be removed using a pry tool, rather than being hammered because the pin need only travel a short distance before it is free from the channel. Once free, the lock pin may be removed by hand. In contrast, with a conventional drive-through lock pin, the two bearing surfaces of the pin are nearly parallel in order to ensure good bearing contact between the point and the nose. Consequently, the drive-through locking pin encounters significant resistance along the entire distance of travel as it is inserted into or removed from the wear assembly.

Another advantage of the tapered lock pin of the present invention is that the force required to remove the lock with the lock member engaged is greater than that required to remove a conventional drive-through locking pin. The tapered locking pin is prevented from moving downward because the groove narrows or terminates, and the locking member, such as the set screw, prevents the lock pin from moving upward out of the groove. The lock pin thus relies on mechanical interference, rather than a tight fit, to prevent removal of the tapered locking pin once installed.

The above discussion concerns the preferred embodiments of the present invention. Various other embodiments as well as many changes and alterations may be made without departing from the spirit and broader aspects of the invention as claimed.

We claim:

1. A wear member for an excavating bucket comprising a pair of sidewalls, converging walls converging toward a front wear portion to contact materials to be excavated during digging by the excavating bucket, and a rearwardly opening socket for receiving a nose secured to an excavating bucket, the socket having a longitudinal axis and being defined by (i) converging surfaces adapted to overlie converging walls of the nose, (ii) side surfaces adapted to overlie sidewalls of the nose, (iii) a groove on each of the side surfaces for receiving rails formed on the nose, each said groove being defined by one of the converging surfaces and a lateral surface extending inward from one of the side surfaces, each said lateral surface being inclined in an axial direction to the longitudinal axis and defining a bearing surface to contact one of the rails to resist loads during use, and each said lateral surface being inclined to the longitudinal axis in the same general direction as the converging surface that the lateral surface faces and (iv) a front end including opposite front stabilizing surfaces forward of the converging surfaces and extending between the side surfaces, each of the front stabilizing surfaces extending generally parallel to the longitudinal axis in the axial direction to contact complementary surfaces on the nose to resist loads during use.

2. A wear member in accordance with claim 1 in which each said groove has a substantially constant width and depth along substantially the entire length thereof.

3. A wear member in accordance with claim 1 in which the grooves each extends generally linearly along the side surfaces of the socket.

4. A wear member in accordance with claim 1 in which the wear member is a point with a front digging edge.

5. A wear member in accordance with claim 1 wherein the lateral surface faces generally upward to produce in use a resisting force having a component that tends to pull the wear member rearward onto the nose for certain loads having downward vertical components applied to the front end of the wear member.

6. A wear member in accordance with claim 1 wherein the lateral surface faces generally downward to produce in use a resisting force having a component that tends to pull the wear member rearward onto the nose for certain loads having upward vertical components applied to the front end of the wear member.

7. A wear member for an excavating bucket comprising a front end and a socket having an open rear end to receive a nose fixed to an excavating bucket, the socket having a longitudinal axis and being defined by (i) a front surface, (ii) converging surfaces converging toward the front surface and being adapted to overlie converging walls of the nose, (iii) side surfaces extending between the converging surfaces and being adapted to overlie sidewalls of the nose, and (iv) a lateral surface positioned along one of the side surfaces between the front surface and the open rear end of the socket, said lateral surface extending inward at an obtuse angle to the respective side surface and facing in a direction generally toward one of the converging surfaces, the lateral surface extending axially in general alignment with a vertical plane and being axially inclined to the longitudinal axis to contact complementary surfaces on the nose and produce in use a resisting force having a component that tends to pull the wear member rearward onto the nose for certain loads applied to the front end of the wear member.

8. A wear member in accordance with claim 7 wherein the lateral surface is inclined relative to the longitudinal axis in the same general direction as the converging surface toward which the lateral surface generally faces.

9. A wear member in accordance with claim 7 wherein one said lateral surface extends along each of said side surfaces of the socket.

10. A wear member in accordance with claim 9 wherein a first of said lateral surfaces faces generally toward a first of the converging surfaces, and a second of said lateral surfaces faces toward a second of the converging surfaces.

11. A wear member in accordance with claim 7 wherein each said lateral surface extends from the front surface to the rear end of the socket.

12. A wear member in accordance with claim 7 wherein the lateral surface faces generally upward to produce in use a resisting force having a component that tends to pull the wear member rearward onto the nose for certain loads having downward vertical components applied to the front end of the wear member.

13. A wear member in accordance with claim 7 wherein the lateral surface faces generally downward to produce in use a resisting force having a component that tends to pull the wear member rearward onto the nose for certain loads having upward vertical components applied to the front end of the wear member.

14. A wear member in accordance with claim 7 wherein the socket includes a front end having opposite front stabilizing surfaces forward of the converging surfaces and extending between the side surfaces, each of the front stabilizing surfaces extending generally parallel to the longitudinal axis to contact complementary surfaces on the nose.

15. A wear assembly for an excavating bucket comprising:
   an adapter fixed to a lip of an excavating bucket and including a forwardly projecting nose having converging walls and sidewalls;
   a wear member having a front end, a socket having an open rear end to receive the nose of the adapter, the socket having a longitudinal axis and being defined by (i) a front surface, (ii) converging surfaces converging toward the front surface and overlying the converging walls of the nose, (iii) side surfaces extending between the converging surfaces and overlying the sidewalls of the nose, and (iv) a lateral surface positioned along one of the side surfaces between the front surface and the open rear end of the socket, said lateral surface extending inward at an obtuse angle to the respective side surface and facing in a direction generally toward one of the converging surfaces, the lateral surface extending axially in general alignment with a vertical plane and being axially inclined to the longitudinal axis to contact complementary surfaces on the nose and produce in use a resisting force having a component that tends to pull the wear member rearward onto the nose for certain loads applied to the front end of the wear member; and a lock to releasably secure the wear member to the nose.

16. A wear assembly in accordance with claim 15 wherein the nose has a lateral surface to engage each said lateral surface of the wear member.

17. A wear assembly in accordance with claim 16 wherein each said lateral surface of the nose extends along a sidewall of the nose.

18. A wear assembly in accordance with claim 17 wherein each said lateral surface of the nose is inclined to the longitudinal axis in the same direction as the lateral surface of the wear member which it engages.

19. A wear assembly for an excavating bucket comprising:

an adapter fixed to a lip of an excavating bucket and including a forwardly projecting nose having converging walls and sidewalls, each of the sidewalls including a rail;

a wear member for an excavating bucket comprising a pair of sidewalls, converging walls converging toward a front wear section to contact materials to be excavated during digging by the excavating bucket, and a rearwardly opening socket for receiving a nose secured to an excavating bucket, the socket having a longitudinal axis and being defined by (i) converging surfaces adapted to overlie the converging walls of the nose, (ii) side surfaces adapted to overlie the sidewalls of the nose, (iii) a groove on each of the side surfaces for receiving the rails formed on the nose, each said groove being defined by one of the converging surfaces and a lateral surface extending inward from one of the side surfaces, each said lateral surface being inclined in an axial direction to the longitudinal axis and defining a bearing surface to contact one of the rails to resist loads during use, and each said lateral surface being inclined to the longitudinal axis in the same general direction as the converging surface that the lateral surface faces and (iv) a front end including opposite front stabilizing surfaces forward of the converging surfaces and extending between the side surfaces, each of the front stabilizing surfaces extending generally parallel to the longitudinal axis in the axial direction to contact complementary surfaces on the nose to resist loads during use; and a lock to releasably secure the wear member to the nose.

* * * * *